United States Patent
Tamura

(10) Patent No.: US 7,768,224 B2
(45) Date of Patent: Aug. 3, 2010

(54) CONTROL APPARATUS FOR AND CONTROL METHOD OF CONTROLLING MOTOR FOR VEHICLE

(75) Inventor: Tetsuro Tamura, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 202 days.

(21) Appl. No.: 12/046,831

(22) Filed: Mar. 12, 2008

(65) Prior Publication Data
US 2008/0226266 A1    Sep. 18, 2008

(30) Foreign Application Priority Data
Mar. 13, 2007  (JP) ............... 2007-063898
Feb. 14, 2008  (JP) ............... 2008-033403

(51) Int. Cl.
*G05B 11/28* (2006.01)
(52) U.S. Cl. ............... 318/599; 318/811; 388/804; 388/811; 388/819
(58) Field of Classification Search ............... 318/599, 318/811, 432, 434; 388/800, 804, 811, 819
See application file for complete search history.

(56) References Cited

U.S. PATENT DOCUMENTS

| | | | | |
|---|---|---|---|---|
| 4,772,833 A | * | 9/1988 | Tanaka | 318/599 |
| 5,752,209 A | * | 5/1998 | Nishimoto et al. | 701/41 |
| 5,834,910 A | * | 11/1998 | Tsurumi et al. | 318/139 |
| 2006/0061335 A1 | * | 3/2006 | Inokuchi et al. | 322/37 |

FOREIGN PATENT DOCUMENTS

| JP | 5-213207 A | 8/1993 |
|---|---|---|
| JP | 5 292042 A | 11/1993 |

\* cited by examiner

*Primary Examiner*—Rina I Duda
(74) *Attorney, Agent, or Firm*—Crowell & Moring LLP

(57) ABSTRACT

The present invention is aimed at provision of a control apparatus for and a control method of controlling a motor for a vehicle driven by a driving circuit that operates according to a pulse width modulation (PWM) signal. Measurement of a duty of an output signal from the driving circuit is executed, and a difference between the measured duty and a target duty in a PWM control is then obtained to further execute setting of a correction value for correcting the target duty based on the above difference and to generate the PWM signal based on the corrected target duty.

17 Claims, 29 Drawing Sheets 100 ms ELAPSE AFTER UPDATING BASIC CORRECTION VALUE (CORRECTION VALUE = −10)

TARGET DUTY: 60% (TIMER VALUE = 300)

INPUT FROM DRIVING CIRCUIT

SETTING VALUE = TARGET + CORRECTION VALUE=300+(−10)=290

OUTPUT FROM DRIVING CIRCUIT

DETECTION VALUE=304

CONTROL APPARATUS FOR AND CONTROL METHOD OF CONTROLLING MOTOR FOR VEHICLE

BACKGROUND OF THE INVENTION

1. Field of the Invention

The present invention relates to an apparatus for and a method of controlling driving of a motor, which is not exclusively but preferably adapted for use in a vehicle, when the motor for the vehicle is driven by a drive circuit capable of operating according to a pulse width modulation (PWM) signal.

2. Description of the Related Art

Japanese Laid-Open (Kokai) Patent Application Publication No. 1993(H05)-213207 discloses an electric power steering apparatus using a motor driven according to a PWM signal.

Japanese Laid-Open (Kokai) Patent Application Publication No. 1993(H05)-292042 discloses such an art that in a communication apparatus of a PWM signal, a deviation of a pulse width generating during a transmitting and receiving process is detected and correction of the pulse width of the received PWM modulated data pulse is made based on the deviation.

Herein, according to the communication apparatus disclosed in Japanese Laid-Open (Kokai) Patent Application Publication No. 1993(H05)-292042, it is possible to accurately transmit and receive the PWM signals.

However, when driving of the motor for the vehicle is conducted by controlling the driving circuit based on the PWM signal, duty of a signal outputted from the driving circuit must become different from duty of the PWM signal due to heat generation of the driving circuit or dispersion of characteristics among respective driving circuits, so that control accuracy in controlling of driving of the motor must be lowered.

SUMMARY OF THE INVENTION

Therefore, it is an object of the present invention to improve control accuracy of a motor adapted for use in a vehicle (it will be hereinafter abbreviated as "vehicle motor" for simplicity) so that the vehicle motor can be driven with target duty in a PWM control even when heat generation of a driving circuit or dispersion of characteristics of the driving circuit occurs.

In order to accomplish the object, the present invention provides a control method of controlling a motor adapted for use in a vehicle and a control apparatus for implementing the same, in which measurement of a duty of an output signal from a driving circuit of the motor arranged to be driven according to a PWM signal is executed, calculation of a difference between the duty of the output signal from the driving circuit and a target duty of the PWM signal is subsequently executed so as to correct the target duty based on the difference, and generation of the PWM signal is executed based on the corrected target duty.

The other objects and features of this invention will become understood from the following description with reference to the accompanying drawings.

DESCRIPTION OF THE PREFERRED EMBODIMENTS

Figure 1:
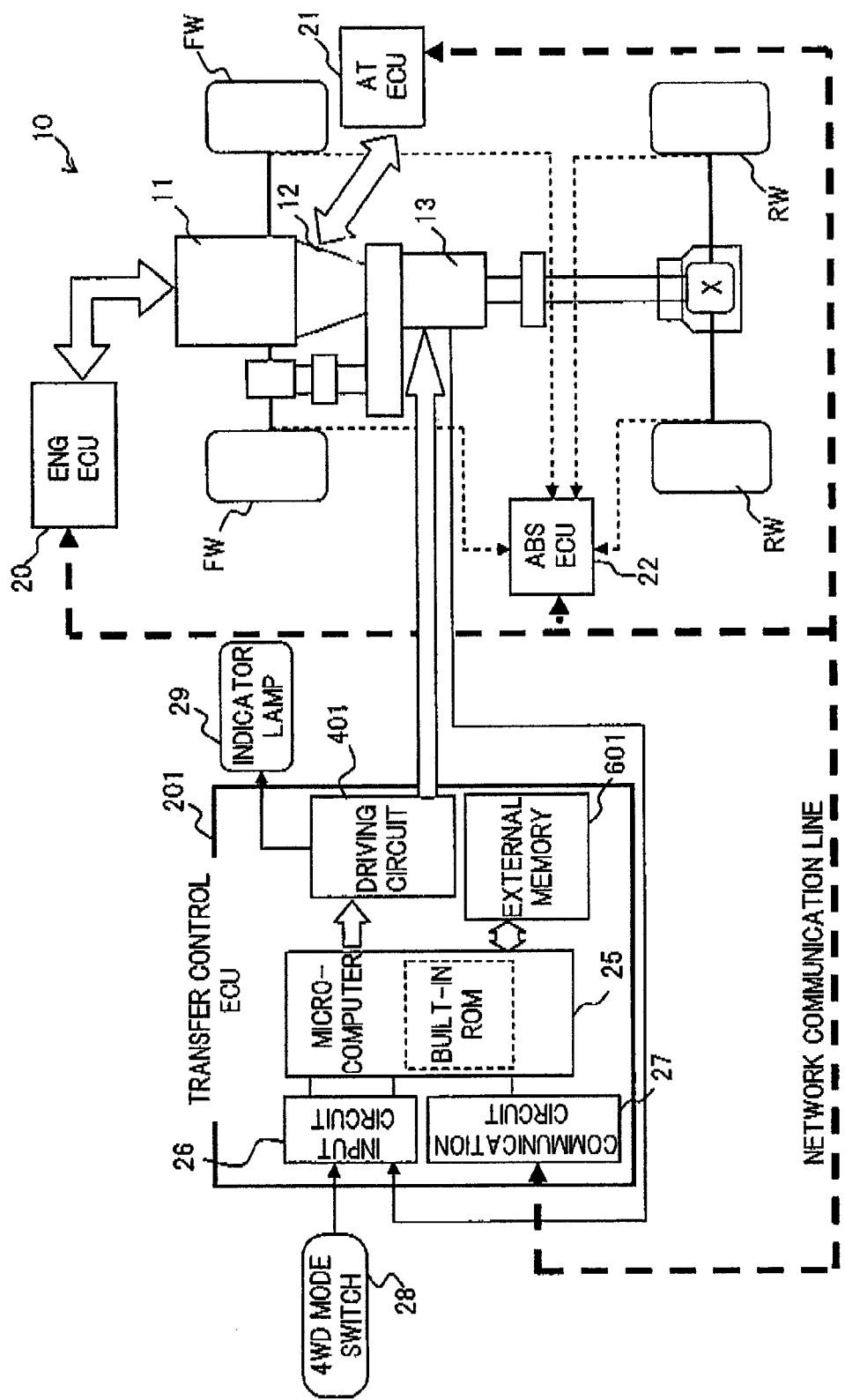
FIG. 1 is a block diagram of a transfer system for a vehicle according to an embodiment of the present invention.

FIG. 1 is a block diagram of a transfer control system for a vehicle.

Referring to FIG. 1, output torque of an engine 11 mounted on a vehicle 10 is transmitted, in a distribution manner, to a front wheel (FW) and a rear wheel (RW) via a transmission 12 and a transfer 13.

Engine 11 is controlled by an electronic control unit (ECU) 20, transmission 12 is controlled by an ECU 21, and transfer 13 is controlled by an ECU 201.

The transfer control system is also provided with an ECU 22 that controls the brakes for each of the wheels.

Transfer 13 includes a later-described motor 101, a clutch that controls coupling force exerted by motor 101, and the like. Transfer 13 has a function of changing a torque distribution from a front wheel driving state where approximately 100% of the output torque is distributed to the front wheels FW to a four-wheel driving state where the torque is distributed to both the front wheels FW and the rear wheels RW under a distribution ration of approximately 60%:50%.

Specifically, a pressing force exhibited by the clutch to perform a torque transfer to the rear wheel RW is controlled by a rotational angle of the motor built in transfer 13 so that the torque transferred to the rear wheel RW is controlled.

Additionally, it should be understood that in the present embodiment, the four-wheel driving system is configured based on the front-wheel driving and a torque may be also distributed to the rear wheels (RW), but the four-wheel driving system may alternatively be configured based on the rear-wheel driving while permitting a torque to be distributed to the front wheels (FW).

ECU 201 includes a driving circuit 401 that drives the motor that is built into transfer 13, a memory 601, a microcomputer 25, an input circuit 26, a communication circuit 27, and the like.

ECU 201 also receives a signal as an input from a switch 28 for designating a mode, i.e., a drive mode, and further controls lighting of an indicator lamp 29.

ECU 201 calculates the transfer torque (torque distribution ratio) of transfer 13 according to a vehicle speed, a slip amount of the respective front wheels FW, an engine output torque, a gear position (transmission ratio) of transmission 12, or the like to control voltage applied to the motor built into transfer 13 for realizing the targeted transfer torque, thereby controlling a rotation angle of an output shaft of the built-in motor.

Figure 2:
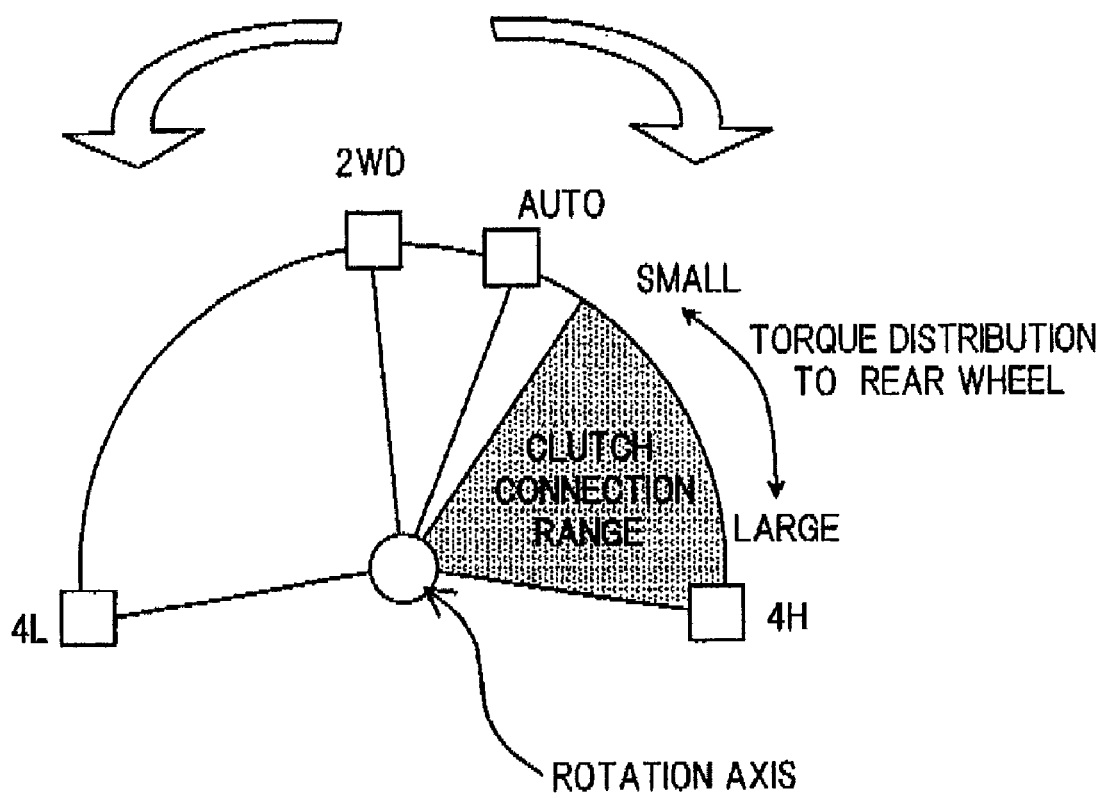
FIG. 2 is a diagrammatic view illustrating a correlation between a mode of the transfer system and an angle of an output shaft of a vehicle motor.

FIG. 2 is a schematic diagrammatic view illustrating a correlation between each mode of transfer 13 and the rotational angle of the output shaft of the above-mentioned motor, wherein the modes are switched according to the rotational angle of the motor.

A 2WD mode (a front-wheel driving mode) positions the output shaft of the motor at the angular position of the 2WD mode, thereby distributing approximately 100% torque to the front wheels FW.

An AUTO mode (an automatic control mode of distribution ratio) changes the rotational angle of the output shaft of the motor within a range from an AUTO position to a 4H position, thereby variably controlling the torque distribution from the front-wheel driving state that distributes approximately 100% torque to the front wheels FW to the four-wheel driving state where the torque distribution ratio between the front wheels FW and the rear wheels RW are approximately 50%:50%.

A 4H mode drives the motor towards the 4H position at the maximum torque thereof, to fixedly maintain it at the 4H position, thereby keeping the torque distribution ratio between the front wheels FW and the rear wheels RW at 50%:50%.

A 4L mode mechanically couples the front wheels and the rear wheels to keep the torque distribution ratio (%) at 50:50.

If the 4L mode and the 2WD mode rotate the output shaft of the motor to the position of the 4L mode and the position of the 2WD mode, respectively, the motor driving is stopped to hold the 4L mode or the 2WD mode.

Figure 3:
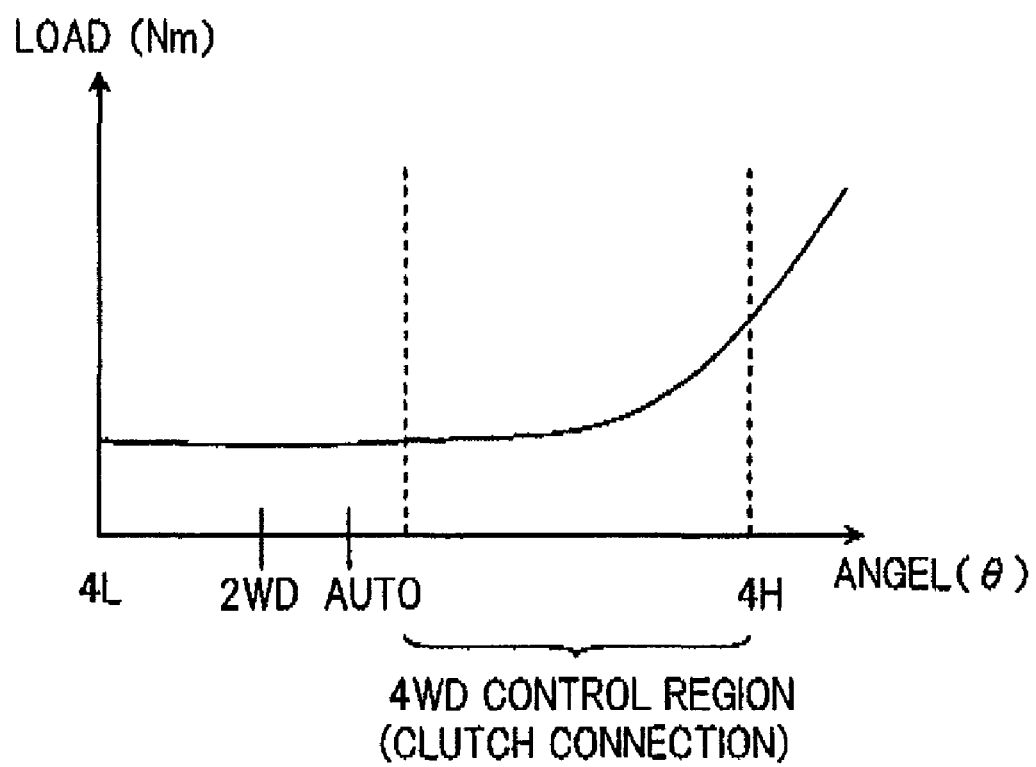
FIG. 3 is a graphical view illustrating a correlation between a load and a rotation angle of a vehicle motor employed in the transfer system.

As shown in FIG. 3, in the AUTO mode, as the motor approaches the 4H position, the load torque of the motor becomes large, and as the load torque of the motor increases, the torque distribution amount to the rear wheels RW is increased.

Figure 4:
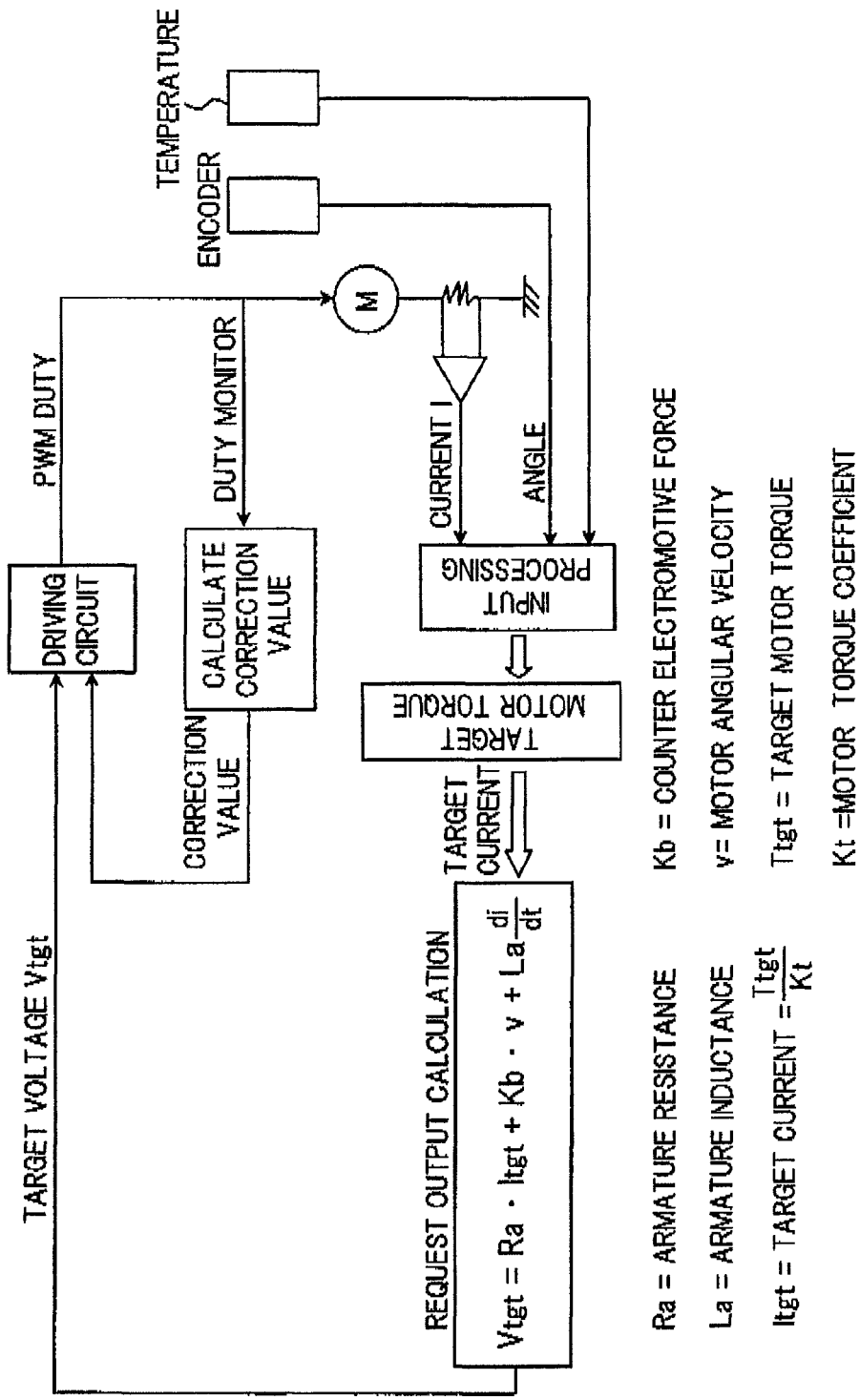
FIG. 4 is a block diagram of a control circuit of the vehicle motor employed in the transfer system.

As shown in FIG. 4, the AUTO mode calculates a target current $I_{tgt}$ corresponding to a target motor torque (a target transfer torque to the rear wheels) and then calculates a target voltage $V_{tgt}$, which is capable of obtaining the target current $I_{tgt}$ and controls the switching of the motor with the PWM signal in the duty corresponding to the target voltage $V_{tgt}$, thereby controlling average voltage applied to the motor to the target voltage $V_{tgt}$.

As described above, although the AUTO mode changes the rotational angle of the motor within a given range from the AUTO position to the 4H position in response to a change in a request for the torque transfer to the rear wheels RW, a time duration for changing the motor rotational angle from the AUTO position to the angle position where the coupling of the clutch starts becomes a waste time. Further, after the coupling of the clutch starts, the load of the motor for a change in the rotational angle of the motor sharply changes.

For this reason, when a feedback control of the motor current is conducted by a proportional-integral-derivative (PID) control based on a difference between the target current and an actual current, it is difficult to avoid generation of hunting or deterioration in convergence in controlling operation while securing a desired response to a change in the target torque.

Also, even when the gain of the feedback control is successfully optimized, since the changing characteristic of the load of the motor varies due to wear of the clutch, etc., it is difficult to maintain the desired response and the suitable convergence performance for a long time.

As a result, even when converting the target current $I_{tgt}$ into the target voltage $V_{tgt}$ and controlling the switching of the motor by the PWM signal based on the target voltage $V_{tgt}$, it is required that the actual switching duty corresponds more accurately to the target duty set based on the target voltage $V_{tgt}$, in order to secure an accuracy of the torque control.

Therefore, as schematically shown in FIG. 4, ECU 201 corrects the target duty according to a difference between the target duty set based on the target voltage $V_{tgt}$ and the actual switching duty, while making it possible to control an applied voltage to the motor at a high accuracy so that the applied voltage approaches the target voltage $V_{tgt}$.

According to the above-mentioned configuration, a time necessary for the output shaft of the motor to converge to the target angle position thereof can be shortened and additionally, an error in the angle position taken by the output shaft is reduced.

Hence, when the wheels slip on a snowy road or the like, a change in the torque distribution is implemented at a high response so as to prevent a slippage of the wheels, while making it possible to achieve contribution to safety driving on the slippery road surface such as the snowy road.

Figure 5:
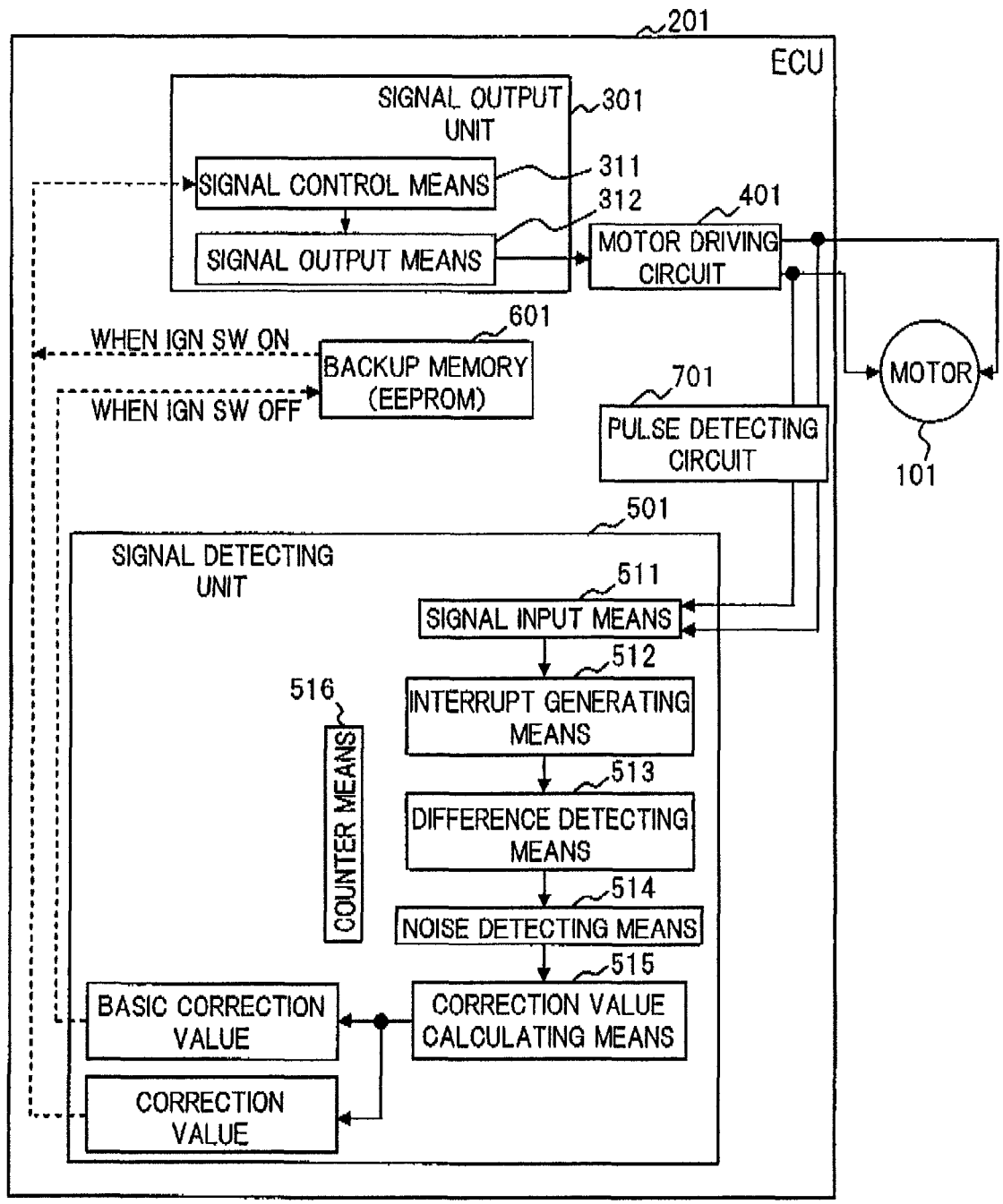
FIG. 5 is a block diagram of an ECU, illustrating a correction control function of a target duty according to an embodiment of the present invention.

FIG. 5 is a block diagram illustrating in detail a correction function of the target duty performed by ECU 201.

Referring to FIG. 5, ECU 201 includes a signal output unit 301 that outputs the PWM signal, driving circuit 401 that amplifies the PWM signal to output it to motor 101, and a signal detecting unit 501 that detects the driving signal output from driving circuit 401 to motor 101.

Motor 101 is built in aforementioned transfer 13 and generates pressing torque of the clutch simultaneously with performing a mode switching.

Also, signal output unit 301 includes a signal control means 311 and a signal output means 312.

Signal control means 311 calculates a given target value on the duty of an ON-signal (it will hereinafter be referred to as "target ON-duty") when controlling the switching of motor 101 with the PWM signal based on a request of the transfer torque to the rear wheel RW, corrects the target ON-duty by using the later-described correction value HD, and outputs the corrected target ON-duty to signal output means 312.

At this stage, it should be understood that the term "ON-duty" may be interpreted as a ratio of time for which the motor is put in an ON-condition thereof within one cycle thereof, throughout the description of the present Application.

Signal output means 312 generates the PWM signal of the ON-duty corresponding to the corrected target ON-duty and outputs it to driving circuit 401.

Driving circuit 401 performs a switching of the motor based on the PWM signal so as to control a direction of application of a power supply to the motor together with controlling of the average voltage applied to motor 101, thereby controlling the rotating direction of motor 101 and the outputted motor torque.

Signal detecting unit 501 includes a signal input means 511, an interrupt generating means 512, a difference detecting means 513, a noise detecting means 514, a correction value calculating means 515, and a counter means 516, and eventually outputs the basic correction value HDB and the correction value HD.

The correction value HD is inputted to signal control means 311 of signal output unit 301 and is used for correcting the target ON-duty. The basic correction value HDB is stored in a backup memory (EEPROM) 601 provided for electronic control unit 201 at a time when an ignition switch (engine switch) is turned off, as described below.

Signal input means 511 inputs therein an output coming from driving circuit 401 through a pulse detecting circuit 701. Interrupt generating means 512 detects an edge of the output from driving circuit 401 to thereby generate the interrupt signal to measure the ON-duty (ON-time) of the output from driving circuit 401 based on the interrupt signal and a count value of counter means 516 (a free running counter).

Difference detecting means 513 calculates a difference between the measured ON-duty of the output from driving circuit 401 and the target ON-duty. Noise detecting means 514 judges whether the noise has an effect on the measurement results of the ON-duty based on the calculated difference.

For example, when the target ON-duty is 50%, although the difference represents the error in an actual ON-duty with respect to the target ON-duty like the case where the actual ON-duty is 40%, if the noise is accumulated in the output from driving circuit 401, the detected result of the duty is detected as a value greatly different from the actual value so that an extremely large difference is obtained by calculation.

Noise detecting means 514, therefore, makes such a judgment that the detection result of the On-duty has been subjected to the noise effect when an absolute value of the difference exceeds a given threshold value, and inhibits updating of the basic correction value HDB on the basis of the detection result.

Correction value calculating means 515 sets a correction value for conforming the ON-duty of the output from driving circuit 401 with the target ON-duty, according to the difference calculated by difference detecting means 513 and the judgment result of noise by noise detecting means 514.

The setting of the correction value will be briefly described below.

For example, under a condition such that an ON-duty is desired to become 50%, if an actual ON-duty were 40%, the target ON-duty is corrected to a certain value larger than 50%, so that the actual ON-duty may be incrementally corrected to 50%. Also, under a condition that the ON-duty is desired to be 50%, if the actual ON-duty were 60%, the target ON-duty is corrected to a certain value smaller than 50%, so that the actual ON-duty may be decremented and corrected to become 50%.

At this stage, there is a case where the duty of the PWM signal, which is inputted to driving circuit 401 does not coincide with the ON-duty of the motor driving signal outputted from driving circuit 401 because of either a change in the characteristic of driving circuit 401 caused by a temperature change or more specifically, that of switching elements such as transistors that constitute driving circuit 401 or dispersion of the characteristic exhibited by each product of the driving circuit.

As described above, if the difference between the target duty and the driving duty of actual motor 101 occurs, the torque distribution is different from the setting value in the transfer control system so that the stability or mobility in the driving and handling of a vehicle is deviated from the target characteristic thereof and if the torque distribution suddenly changes, the stability or mobility in the driving and handling of the vehicle must be suddenly changed.

As described above, since the target ON-duty is corrected based on the ON-duty of the actual motor driving signal, although there is the temperature change or characteristic dispersion, motor 101 can be driven with the target ON-duty, the stability or mobility in the driving and handling of the vehicle can be controlled to be in conformity with its original characteristic, and any sudden change in the stability and mobility can be prevented.

Now, a description of the relation between the basic correction value HDB and the correction value HD will be provided below.

In the present embodiment, the basic correction value HDB is updated per every 100 milli-second (ms), and the correction value HD is updated per every 10 ms. Further, when the correction value HD is changed, only its fixed value is changed, and the initial values of the basic correction value HDB and the correction value HD are 0, respectively. In the present embodiment, the above-mentioned fixed value is 1.

Also, the basic correction value HDB is calculated by the following equation, i.e., the basic correction value HDB=a difference+the correction value HD.

Figure 6:
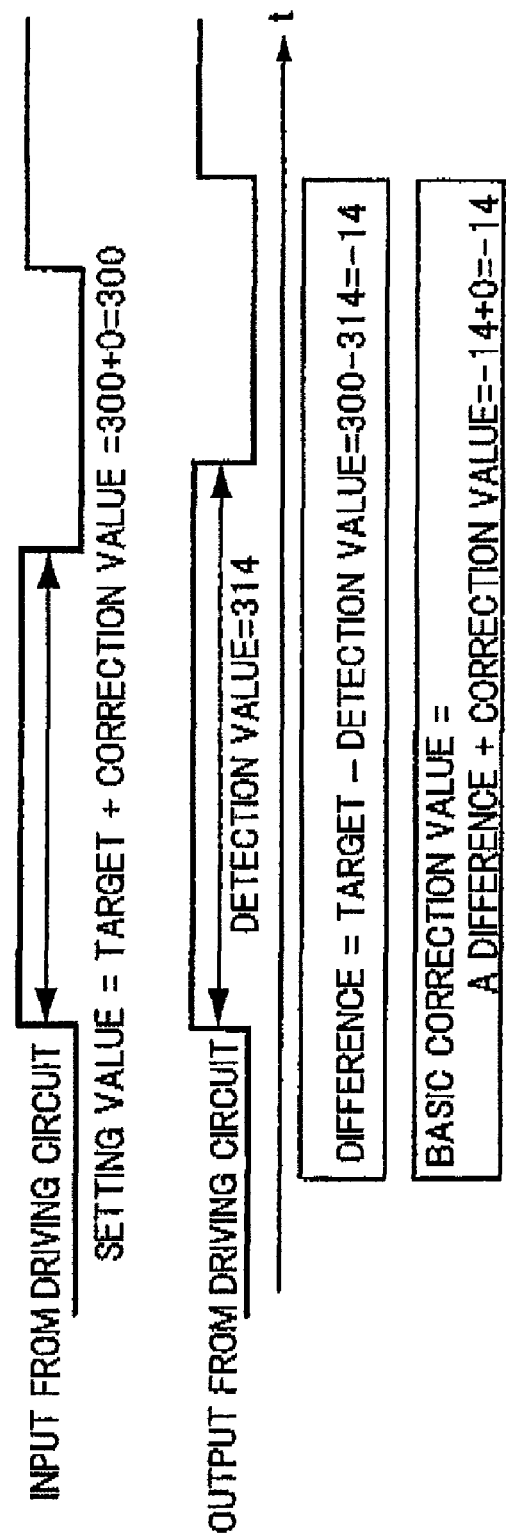
FIG. 6 is a schematic operational diagram illustrating a correlation between correction values and detection results of the duty according to an embodiment of the present invention.

For example, as shown in FIG. 6, when the on-time corresponding to 60% of the target ON-duty is 300 as indicated on the counter, if the actual measurement result is 314, the difference is 300−314=−14, so that the actual on-time is larger by 14 than the target value.

Since the basic correction value HDB=a difference+the correction value HD, if the correction value HD is maintained at the initial value of 0, the basic correction value HDB is calculated as follows, i.e., the basic correction value HDB=−14+0=−14.

At this time, assuming that the error in the pulse width is a simple offset error, when the target of the on-time is processed so as to reduce it by 14 on the counter based on the above-mentioned basic correction value HDB, the actual pulse width will be decremented from 314 to 300, so that the duty may be corrected to the original 60%.

However, if the target duty were corrected based on the basic correction value HDB, the target duty will be suddenly changed, so that the rotational angle of motor 101 is greatly deviated from its target. Therefore, an additional control for removing this difference is needed, and as a result, the control stability of motor 101 is deteriorated.

Therefore, according to the present embodiment, the correction value HD is changed gradually to a value capable of meeting the request so as to correct the target duty by the use of the correction value HD after being changed, thereby making it possible to stably control motor 101 without causing any sudden correction of the target duty.

Figure 7:
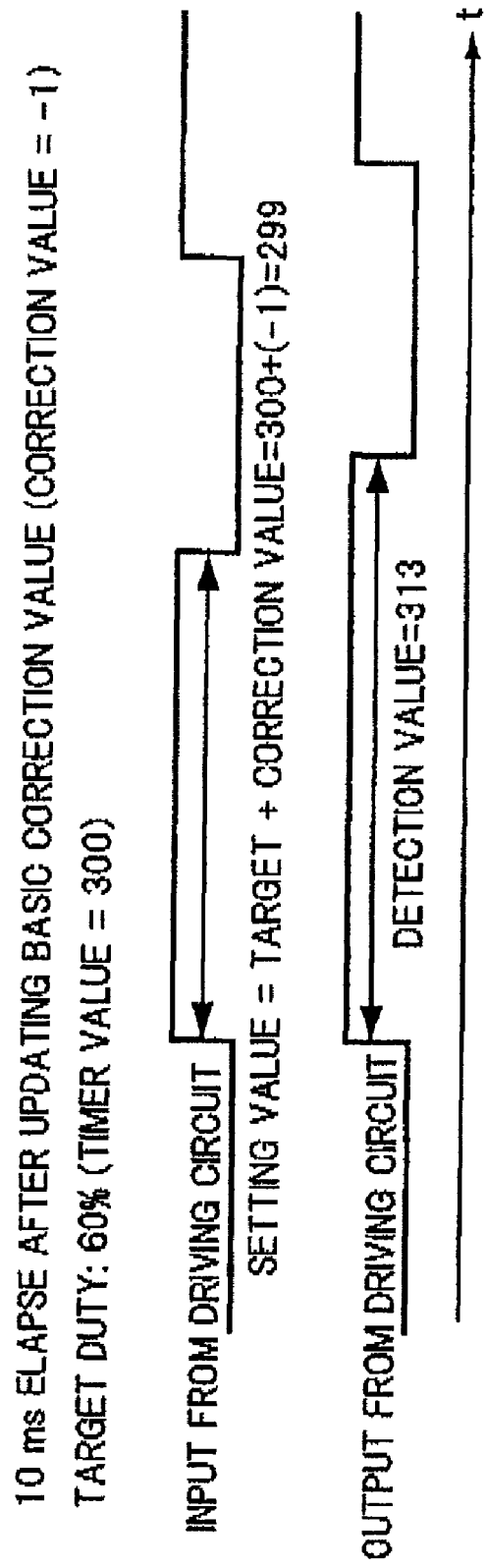
FIG. 7 is a schematic operational diagram illustrating a correlation between correction values and detection results of the duty according to an embodiment of the present invention.

In other words, at an update calculation timing of the correction value HD after an elapse of 10 ms from the calculation timing using the basic correction value HDB of −14, the correction value HD is decremented by 1 as indicated in FIG. 7, so that the correction value HD approaches the basic correction value HDB (=−14).

In this case, since the initial values of the previous correction values HD are 0, the correction values HD are updated to −1 in the update timing and the target on-time=300 indicated on the counter is corrected by the correction value HD, so that the target on-time is 209 indicated on the counter. Thus, when the target on-time is 300, the on-time of the output from the driving circuit that becomes larger by 14 than 300 should be decremented up to 313.

Figure 8:
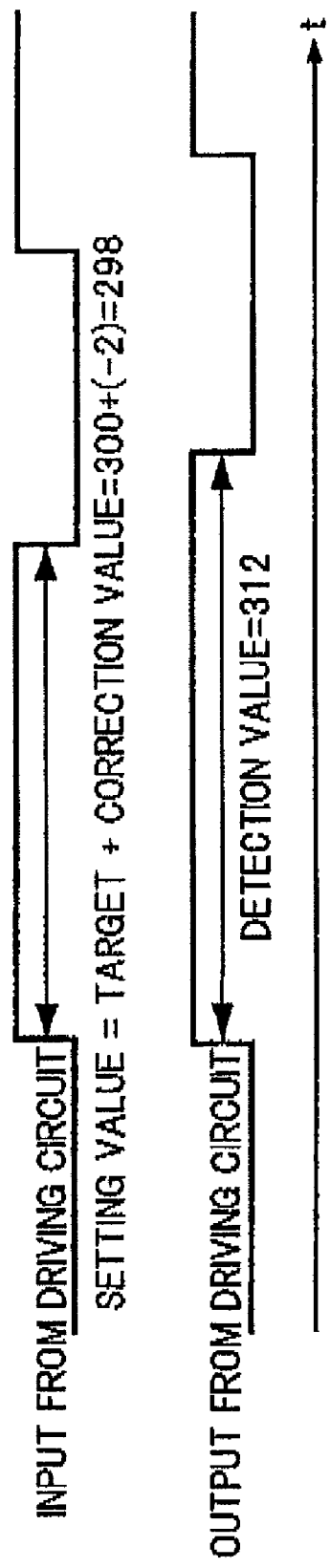
FIG. 8 is a schematic operational diagram illustrating a correlation between correction values and detection results of the duty according to an embodiment of the present invention.

Also, when a time of 10 ms has elapsed, the correction value HD is subtracted by 1 from −1 so that it is set to −2. As a result, the target on-time is decremented to 298, so that the on-time of the output from actual driving circuit 401 is decrementally changed to 312 that is smaller by 1, as indicated in FIG. 8.

Figure 9:
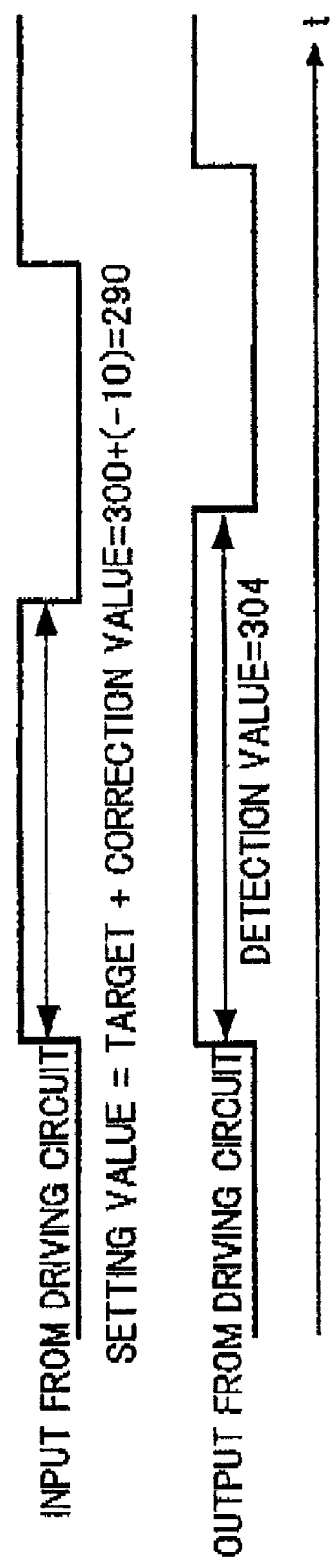
FIG. 9 is a schematic operational diagram illustrating a correlation between correction values and detection results of the duty according to an embodiment of the present invention.

When the update of the correction value HD is repeated according to the foregoing manner, at a moment when a time of 100 ms has elapsed from the timing updating the basic correction value HDB, the correction value HD is changed to −10 as indicated in FIG. 9. At this time, the target on-time is subtracted up to 290 and the on-time of the output from driving circuit 401 is decremented to 304, so that the difference of the on-time is reduced from original −14 to −4.

Figure 10:
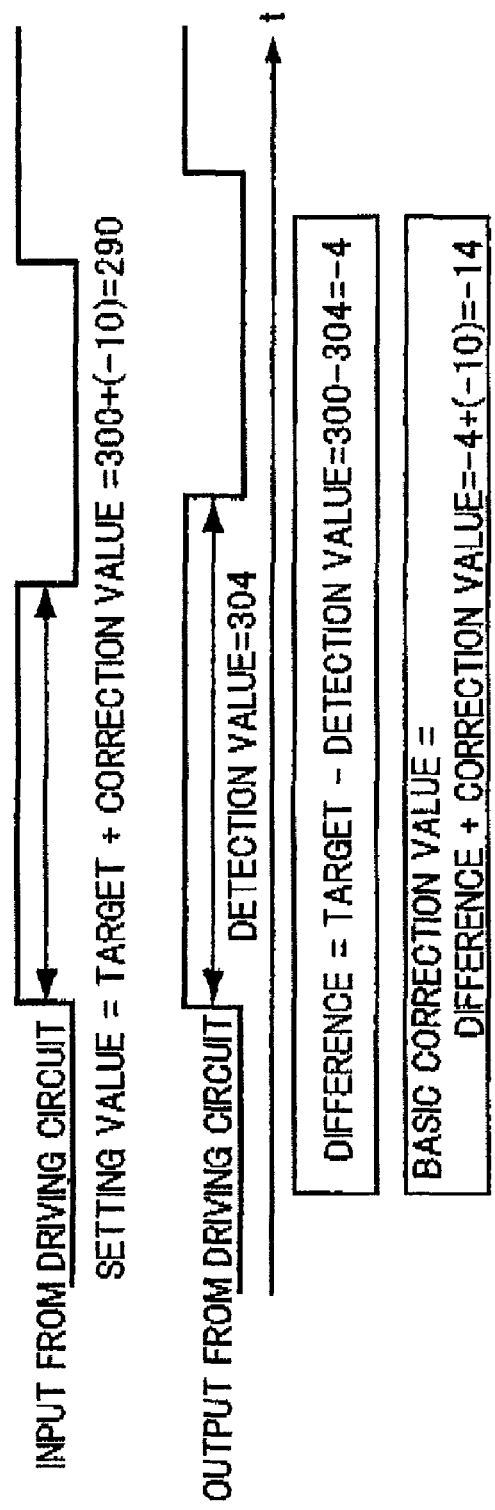
FIG. 10 is a schematic operational diagram illustrating a correlation between correction values and detection results of the duty according to an embodiment of the present invention.

The timing of updating the correction value HD to −10 is also the update timing of the basic correction value HDB, and the basic correction value HDB is calculated as follows, i.e., the basic correction value HDB=−4+(−10)=−14 as indicated in FIG. 10.

Figure 11:
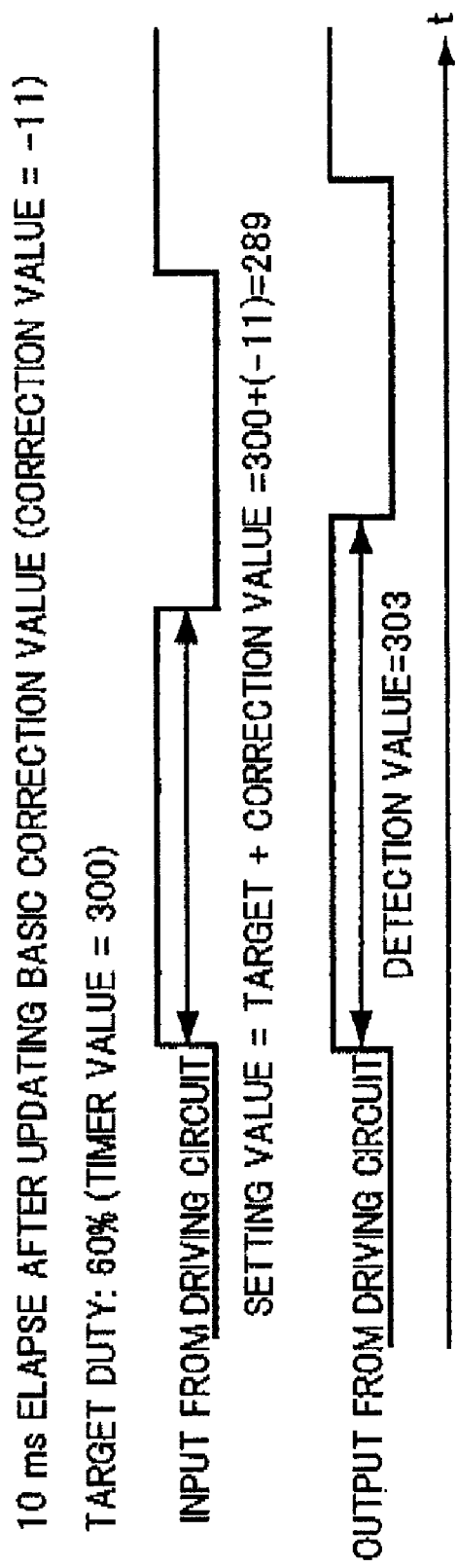
FIG. 11 is a schematic operational diagram illustrating a correlation between correction values and detection results of the duty according to an embodiment of the present invention.

At the update timing of the correction value HD after the elapse of 10 ms from the update timing (FIG. 10) of the basic correction value HDB, the correction value HD is subtracted by 1, so that it is updated to −11, as indicated in FIG. 11.

Figure 12:
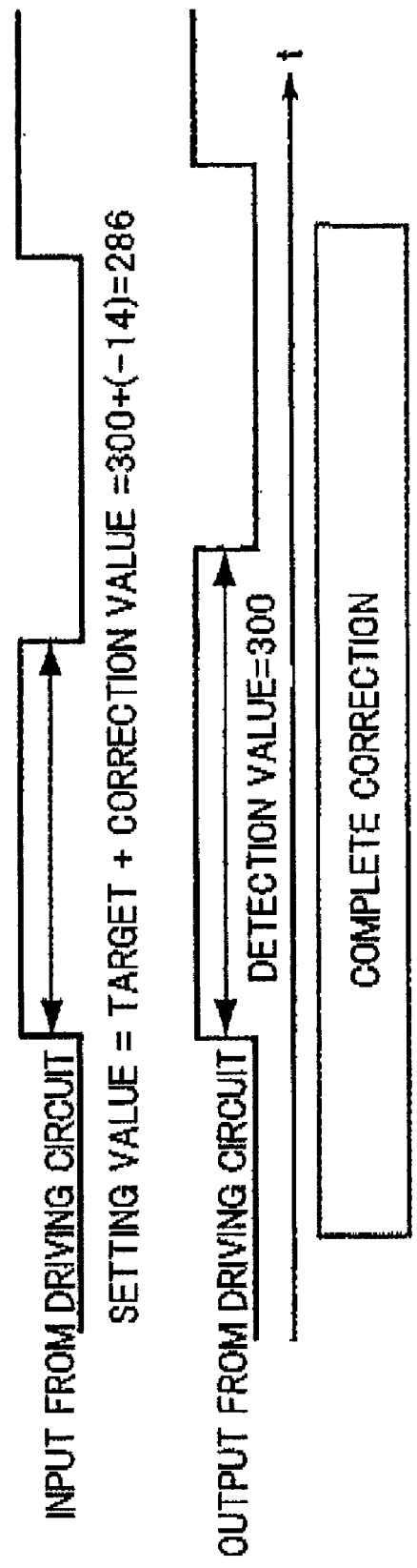
FIG. 12 is a schematic operational diagram illustrating a correlation between correction values and detection results of the duty according to an embodiment of the present invention.

Thereafter, due to subtraction by 1 performed at every 10 ms, as indicated in FIG. 12, the correction value HD at a time when 40 ms has elapsed from the update calculation timing of the basic correction value HDB will be decremented to −14, so that the correction value HD is −14, the target duty is corrected by the correction value HD, so that the on-time of the output from driving circuit 401 becomes to be in conformity with 300 on the counter that corresponds to the target duty of 60%.

Figure 13:
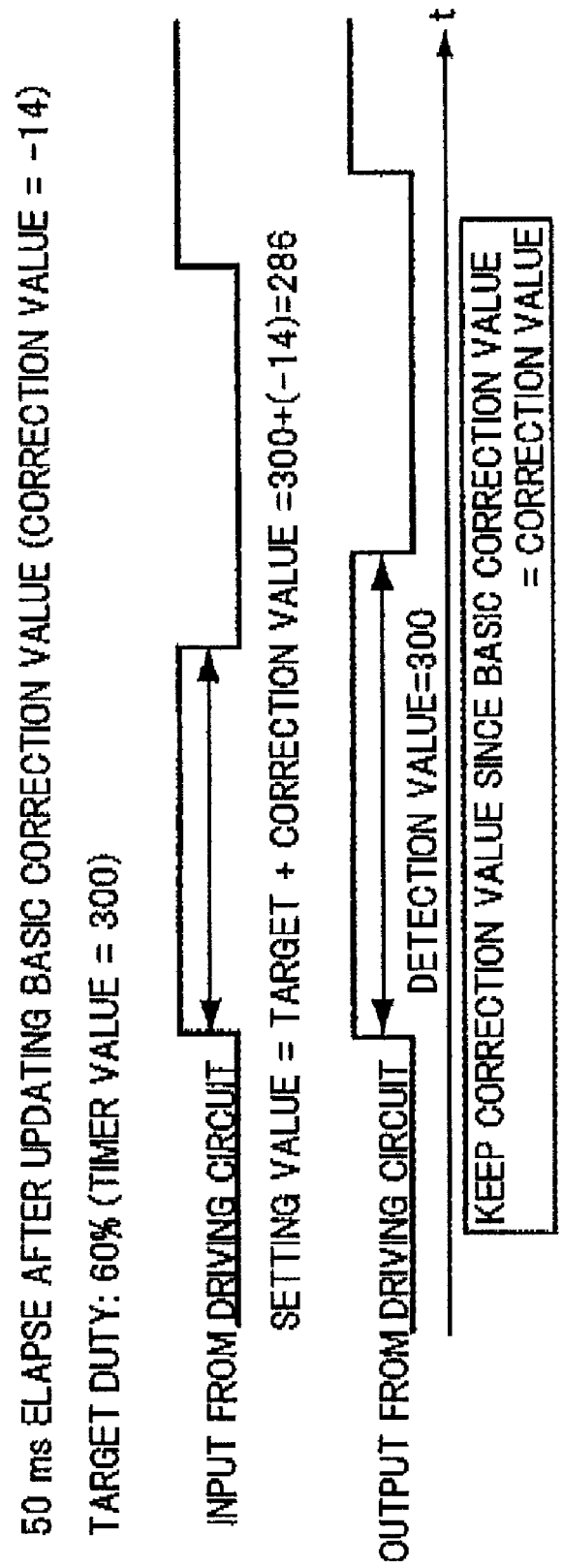
FIG. 13 is a schematic operational diagram illustrating a correlation between correction values and detection results of the duty according to an embodiment of the present invention.
Figure 14:
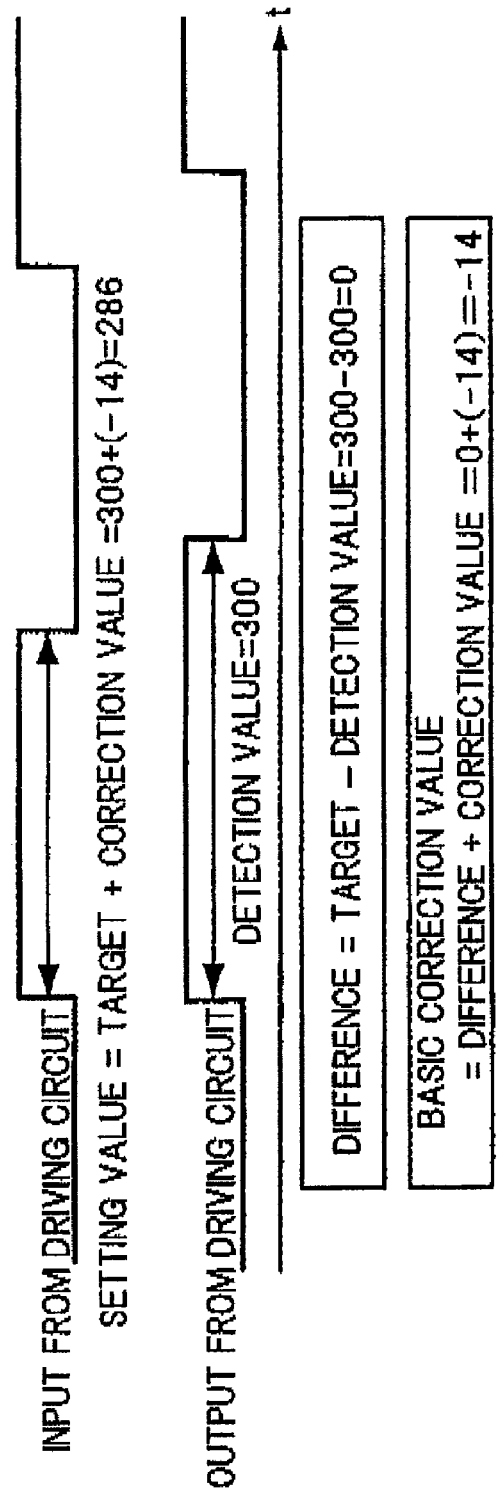
FIG. 14 is a schematic operational diagram illustrating a correlation between correction values and detection results of the duty according to an embodiment of the present invention.

If the correction value HD becomes −14 that is in conformity with the basic correction value HDB, as indicated in FIG. 13, the update of the correction value HD stops, so that the value at that time is held. Thereafter, if the difference is 0 when the calculation timing of the basic correction value HDB has again arrived, as indicated in FIG. 14, the basic correction value HDB is calculated as follows, i.e., the basic correction value HDB=0+(−14)=−14, and the correction value HD of −14 is held ever since.

Thereafter, if there appears again any difference between the target ON-duty and the actual ON-duty, the basic correction value HDB is stepwisely changed by the amount of the difference, so that the correction value HD is updated to gradually approach the basic correction value HDB.

Figure 15:
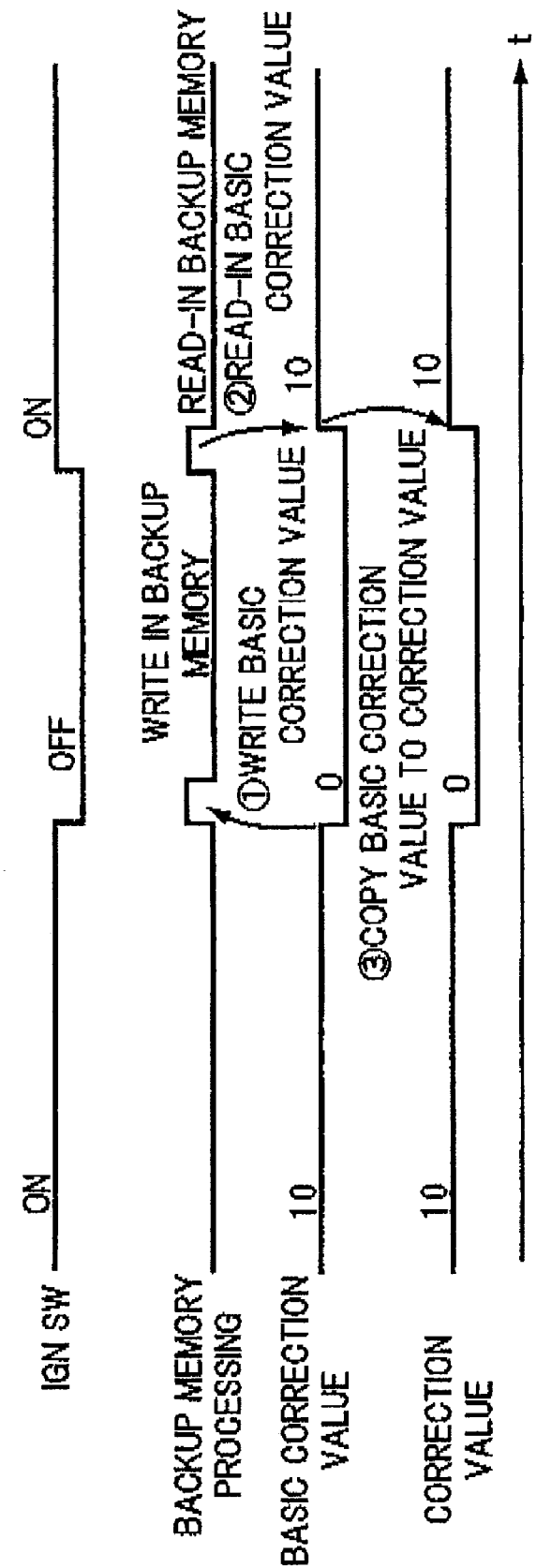
FIG. 15 is a schematic operational diagram illustrating a correlation between correction values and detection results of the duty according to an embodiment of the present invention.

As indicated in FIG. 15, the basic correction value HDB is written in backup memory (EEPROM) 601 when the ignition switch (engine switch) is turned off, and when the ignition switch (engine switch) is turned on, the value of the basic correction value HDB written in backup memory (EEPROM) 601 is read out.

The basic correction value HDB read out from backup memory (EEPROM) 601 is set to the initial value of the basic correction value HDB and the initial value of the correction value HD is set to the same value as the read out basic correction value HDB.

For example, even in a case where the ignition switch (engine switch) is turned off at a time before the basic correction value HDB becomes equal to the correction HD (HDB=HD), when the ignition switch (engine switch) is turned on, the correction value HD is set to the same value as the basic correction value HDB, so that the correction is immediately made so that the actual duty is brought to be in conformity with the target duty.

Unlike a correction conducted from the midway of execution of the motor driving control, this has such an advantage that it is possible to perform a control, which is capable of actually driving motor 101 with the target duty from the beginning rather than suddenly changing the generation torque and rotating speed of motor 101 even when the initial value of the correction value HD is the correction requesting level.

With the described transfer control system, for example, if the generation torque and the rotating speed of motor 101 are suddenly changed during the control operation, the torque distribution is in turn suddenly changed to thereby suddenly change the stability or mobility in the driving and handling of the vehicle. However, at the initial stage of the control operation, motor 101 will be driven from the beginning with a corrected duty and thus, any sudden change in the generation torque and rotating speed of motor 101 do not occur, so that no sudden change in the stability or mobility of the driving and handling of the vehicle take place.

Hereinafter, the PWM control of driving circuit 401 will be described in detail with reference to the flowcharts of FIGS. 16 through 21.

Figure 16:
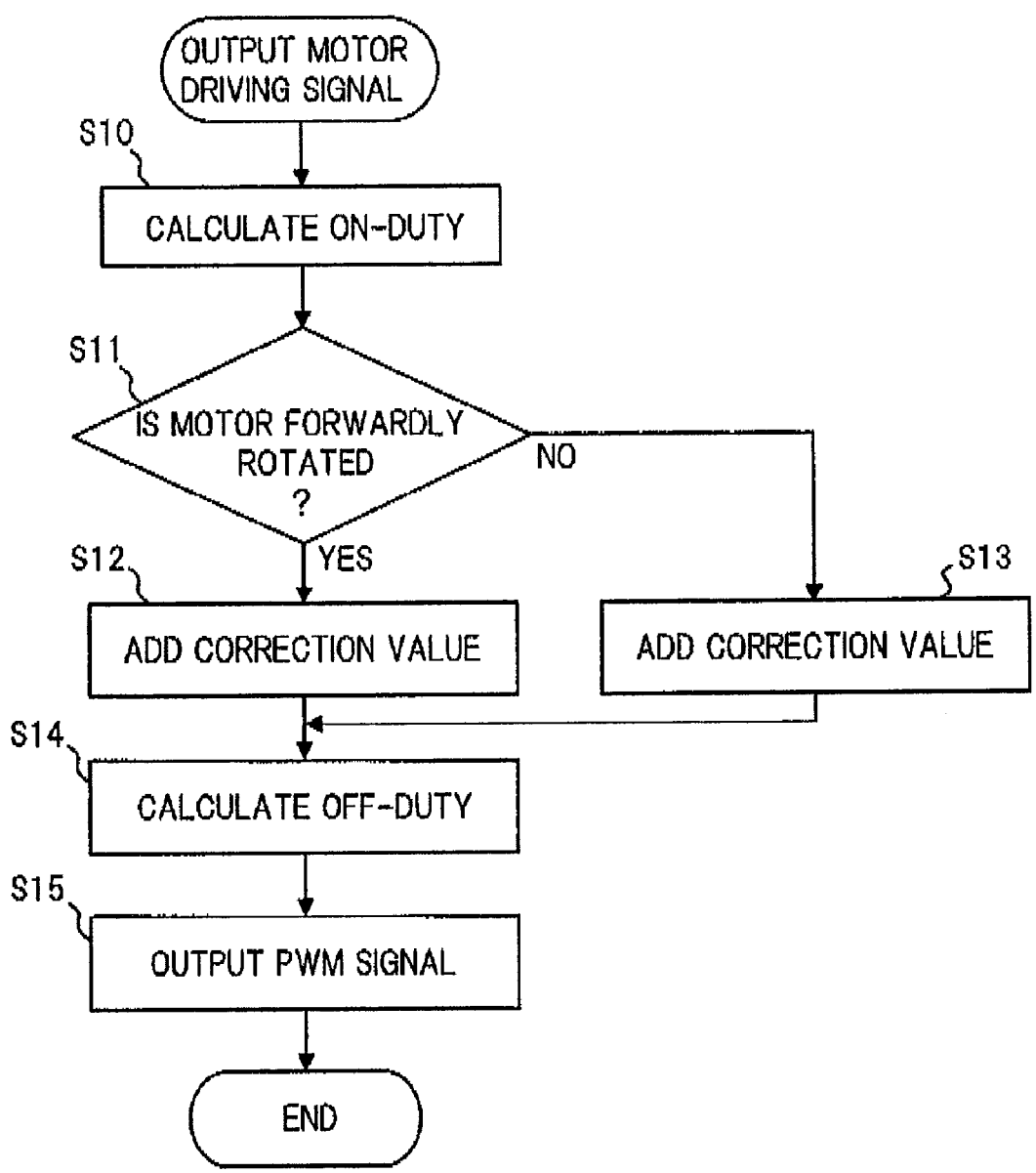
FIG. 16 is a flowchart illustrating an output control of a PWM signal according to an embodiment of the present invention.

The flowchart of FIG. 16 indicates a routine for executing the output control of the PWM signal, and the execution of this routine occurs at every predetermined minute period of time.

At first, step S10 calculates the target ON-duty based on the target (target voltage) of the applied voltage to the motor.

Step S11 judges whether the forward rotation of motor 101 is required or the reverse rotation thereof is required.

If judgment indicates that the forward rotation is required, the control process goes to step S12 to correct the target ON-duty based on the correction value HD for the forward rotation, thereby obtaining the target ON-duty after correction.

Meanwhile, if judgment indicates that the reverse rotation is required, the control process goes to step S13 to correct the target ON-duty based on the correction value HD for the reverse rotation, thereby obtaining the target ON-duty after correction.

Since the difference in the correlation between the target ON-duty and the ON-duty of the output from driving circuit 401 may occur depending on the rotating direction of motor 101, the present embodiment sets the basic correction value HDB and the correction value HD individually depending on whether the rotation direction is the forward direction or the reverse direction.

Generally, when switching of the rotation direction of motor 101 is executed, a bridge circuit configured of switching elements such as transistors is arranged to switch a current direction flowing in motor 101 from one to the other and vice versa. However, in this case, since there is a difference in the turned-on switching element and in the temperature environment of the turned-on switching element depending on the rotation direction of motor 101, difference characteristics between the target duty and the actual duty are different depending on the rotation direction.

Therefore, the difference between the target duty and the actual duty is detected for each rotation direction to learn the correction value HD for each rotating direction, making it possible to cancel the difference between the actual duty and the target duty even when the rotation direction is switched.

Step S14 calculates the target OFF-duty after correction based on the target ON-duty after correction that is calculated at step S12 or step S13.

The control processes of steps S11 through S14 are executed by signal control means 311.

Step S15 allows signal output means 312 to output the PWM signal to driving circuit 401 based on the target ON-duty after correction and the target OFF-duty after correction.

Figure 17:
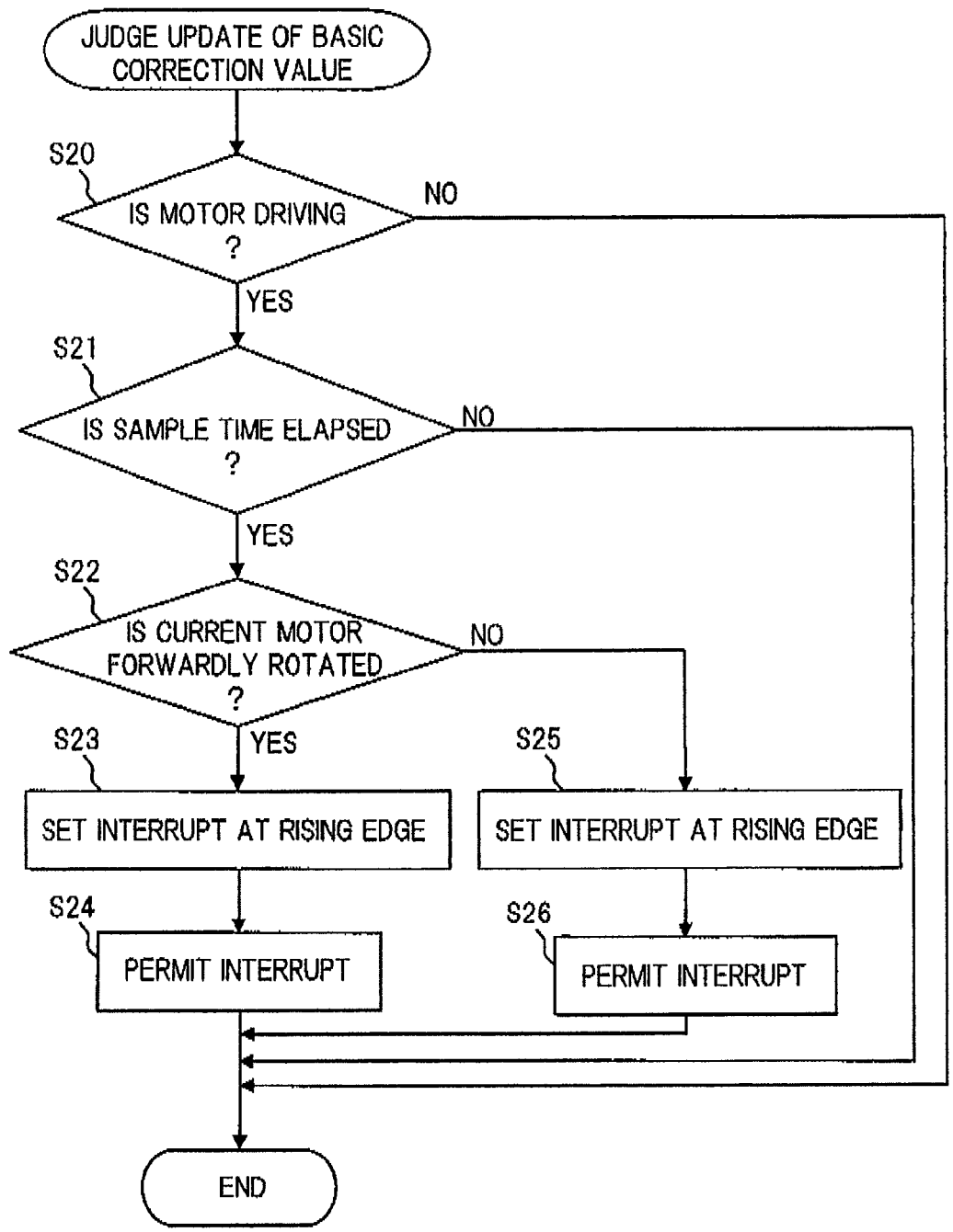
FIG. 17 is a flowchart illustrating a judgment processing for a calculation start of a basic correction value HDB according to an embodiment of the present invention.

The flowchart of FIG. 17 shows a routine judging the calculation start of the basic correction value HDB, the routine being performed per predetermined micro time.

Also, the processes shown in the flowcharts of FIGS. 17, 18 and 19 to be described below are processes that read-in the output from driving circuit 401 in signal detecting unit 501 as it is without being inverted by pulse detecting circuit 701 and are applied when time from the rising to the falling of the read-in signal represents the on-time of motor 101.

Step S20 judges as to whether motor 101 is driven or stopped. If judgment indicates that motor 101 is driven, the control process goes to step S21.

Step S21 judges whether a predetermined cycle (100 ms) has elapsed from the time of calculation of the previous basic correction value HDB.

If judgment indicates that the predetermined cycle has not elapsed, the routine is ended as it is and, if judgment indicates that the predetermined cycle is elapsed, judgment is made as to the update timing of the basic correction value HDB, and then the control process goes to step S22.

Step S22 judges whether motor 101 is driven in the forward rotation direction or in the reverse rotation direction.

If judgment indicates that motor 101 is driven in the forward rotation direction, the control process goes to step S23 to perform the setting that generates the rising (OFF→ON) edge interrupt for the output signal on the forward rotation side inputted to signal input means 511 for interrupt generating means 512, and the next step S24 permits the interrupt processing to be executed at the rising edge of the motor driving output on the forward rotation side.

If judgment indicates that motor 101 is driven in the reverse rotation direction, on the other hand, the control process goes to step S25 to execute the setting that generates the rising edge interrupt for the output signal on the reverse rotation side inputted to signal input means 511 for interrupt generating means 512, and the next step S26 permits the interrupt processing to be executed at the rising edge of the motor driving output on the reverse rotation side.

Figure 18:
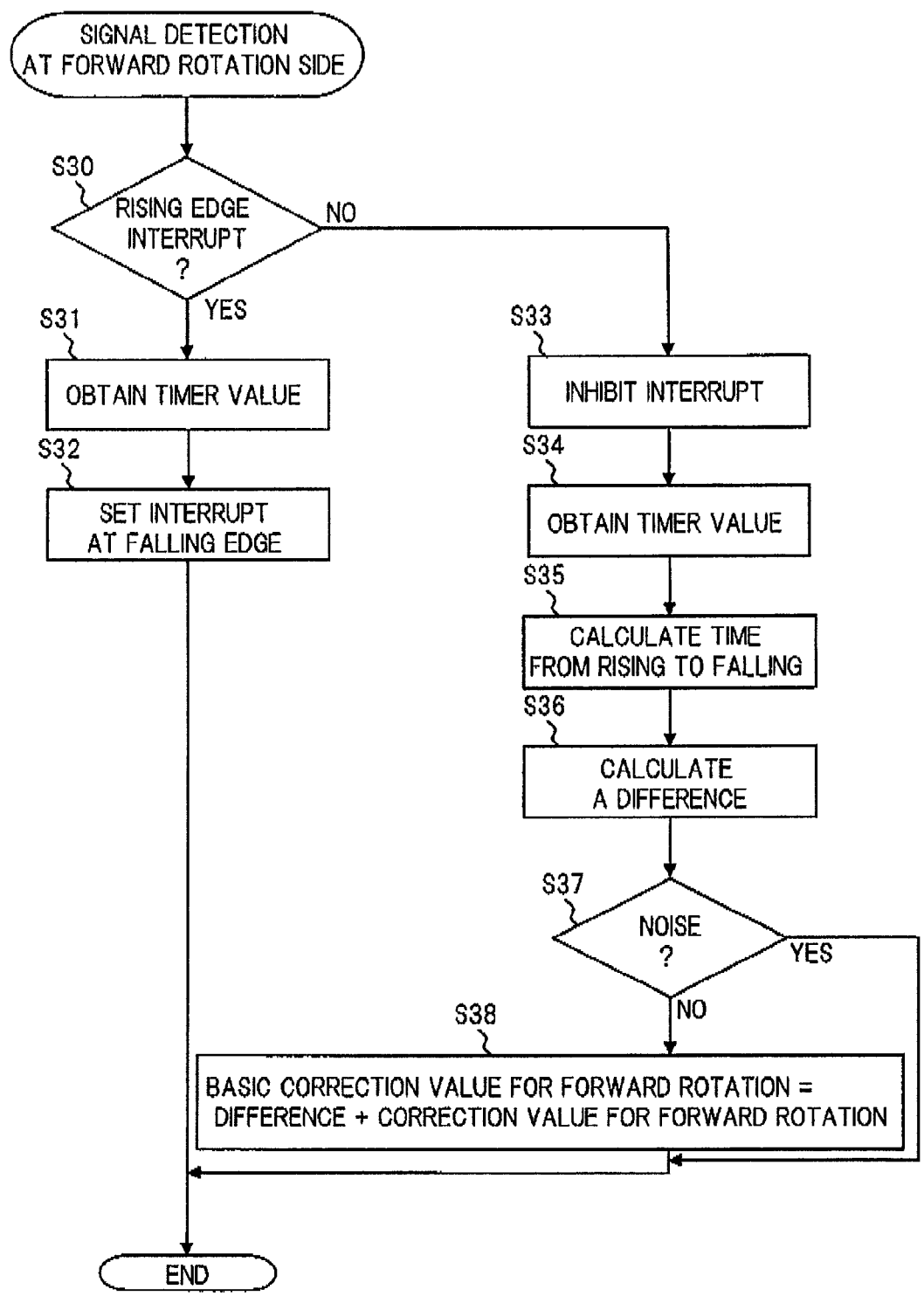
FIG. 18 is a flowchart illustrating a detection processing for a driving output on a forward rotation side according to an embodiment of the present invention.

The flowchart of FIG. 18 is a routine indicating the detection processing on the motor driving output on the forward rotation side, the interrupt processing being executed based on the edge detection of the motor driving output on the forward rotation side.

Step S30 makes judgment as to whether a current interrupt processing is a processing based on the rising edge of the motor driving output on the forward rotation side.

If judgment indicates that the interrupt processing is performed by the rising edge, the process goes to step S31 to read-in the value of the free run counter in counter means 516 and the next step S32 is set so as to generate the interrupt in the falling (ON→OFF) edge of the motor driving output on the forward rotation side.

Step S32 executes the interrupt setting at the falling edge and then executes the interrupt processing based on the edge detection of the motor driving output on the forward rotation side and, if judgment at step S30 indicates that the current interrupt processing is a processing based on the falling edge of the motor driving output on the forward rotation side, the process goes to step S33.

Step S33 inhibits the interrupt processing based on the edge of the motor driving output on the forward rotation side and the next step S34 reads-in the value of the free run counter in counter means 516.

Step S35 calculates the on-time (ON-duty) of the driving output from driving circuit 401 on the forward rotation side as a difference between the value of the free run counter read-in when executing the interrupt processing based on the rising edge of the motor driving output on the forward rotation side and the value of the free run counter read-in the current interrupt processing based on the falling edge of the motor driving output on the forward rotation side.

Step S36 calculates a difference between the target ON-duty and the ON-duty calculated at step S35 by difference detecting means 513.

Step S37 compares an absolute value of the difference and a previously set threshold value, and when the absolute value of the difference exceeds the threshold value, judgment is made that the measurement result of the on-time (ON-duty) of the motor driving output on the forward rotation side is subjected to the noise effect so that the routine bypasses step S38 and is ended as it is, thereby inhibiting the update of the basic correction value HDB for the forward rotation based on the measurement result.

As a result, when the routine bypasses the step 38 and is ended as it is, the basic correction value HDB for the forward rotation holds the previous value.

Meanwhile, if the absolute value of the difference is equal to or less than the threshold value, judgment is made that the measurement result of the on-time (ON-duty) of the motor driving output on the forward rotation side is not subjected to the noise effect so that the process goes to step S38.

Step S38 calculates the basic correction value HDB for the forward rotation according to the following equation based on the difference of the on-time (ON-duty) obtained at step S35 and the correction value HD for the forward rotation.

Basic correction value HDB for forward rotation=a difference+the correction value HD for forward rotation.

Figure 19:
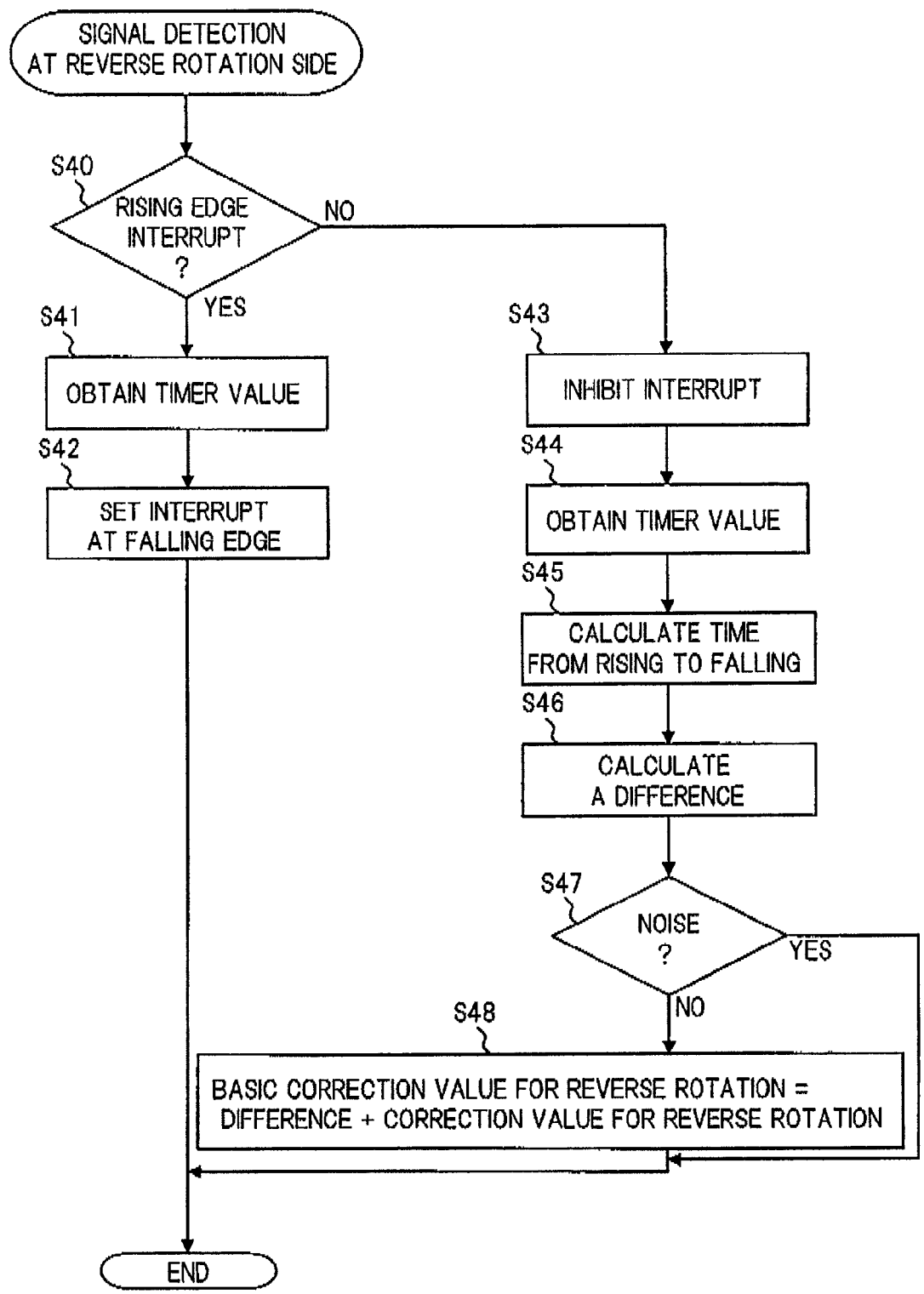
FIG. 19 is a flowchart illustrating a detection processing for a driving output on a reverse rotation side according to an embodiment of the present invention.

The flowchart of FIG. 19 is a routine indicating the detection processing on the motor driving output on the reverse rotation side, the interrupt processing being performed based on the edge detection of the motor driving output on the reverse rotation side.

Step S40 judges as to whether a current interrupt processing is a processing based on the rising edge of the motor driving output on the reverse rotation side.

If judgment indicates that the interrupt processing is executed by the rising edge, the process goes to step S41 to read-in the value of the free run counter in counter means 516 and the next step S42 generates the interrupt at the falling edge of the motor driving output on the reverse rotation side.

Step S42 executes the interrupt setting at the falling edge and then executes the interrupt processing based on the edge detection of the motor driving output on the reverse rotation side and, if judgment at step S40 indicates that the current interrupt processing is a processing based on the falling edge of the motor driving output on the reverse rotation side, the process goes to step S43.

Step S43 inhibits the interrupt processing based on the edge of the motor driving output on the reverse rotation side and the next step S44 reads-in the value of the free run counter in counter means 516.

Step S45 calculates the on-time (ON-duty) of the motor driving output on the reverse rotation side as a difference between the value of the free run counter read-in when performing the interrupt processing based on the rising edge of the motor driving output on the reverse rotation side and the value of the free run counter read-in the current interrupt processing based on the falling edge of the motor driving output on the reverse rotation side.

Step S46 calculates the difference between the target ON-duty and the ON-duty calculated at step S45 by difference detecting means 513.

Step S47 compares the absolute value of the difference and the previously set threshold value and when the absolute value of the difference exceeds the threshold value, judgment is made that the measurement result of the on-time (ON-duty) of the motor driving output on the reverse rotation side is subjected to the noise effect so that the routine bypasses step S48 and is ended as it is, thereby inhibiting the update of the basic correction value HDB for the reverse rotation based on the measurement result.

As a result, when the routine is ended as it is by bypassing step S48, the basic correction value HDB for the reverse rotation holds the previous value.

Meanwhile, if the absolute value of the difference is equal to or less than the threshold value, judgment is made that the measurement result of the on-time (ON-duty) of the motor driving output on the reverse rotation side is not subjected to the noise effect so that the process goes to step S48.

Step S48 calculates the basic correction value HDB for the reverse rotation according to the following equation based on the difference of the on-time (ON-duty) obtained at step S45 and the correction value HD for the reverse rotation.

Basic correction value HDB for reverse rotation=a difference+the correction value HD for reverse rotation.

Figure 20:
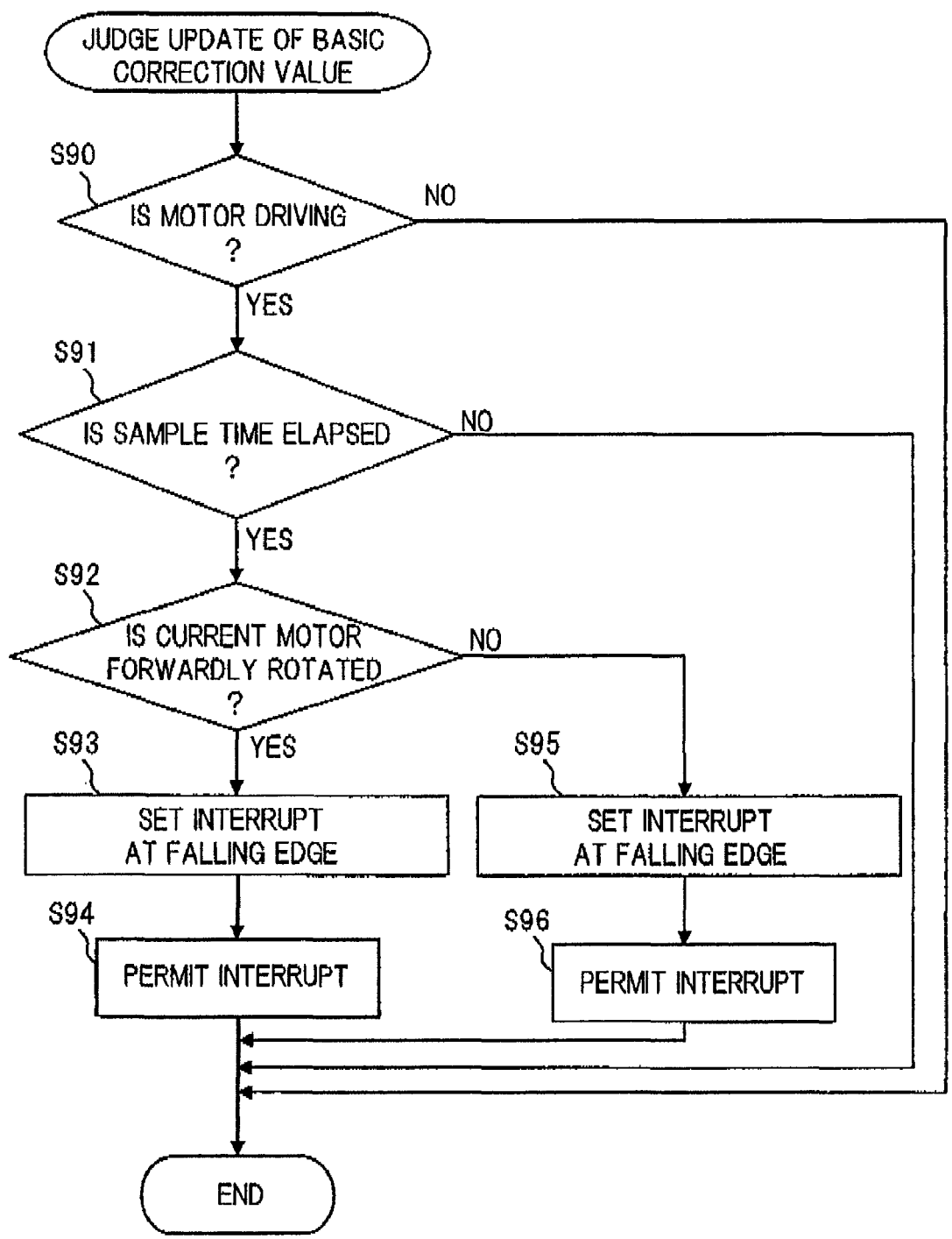
FIG. 20 is a flowchart illustrating a judgment processing for a calculation start of a basic correction value HDB when an output from the driving circuit is inputted after inversion, according to an embodiment of the present invention.
Figure 21:
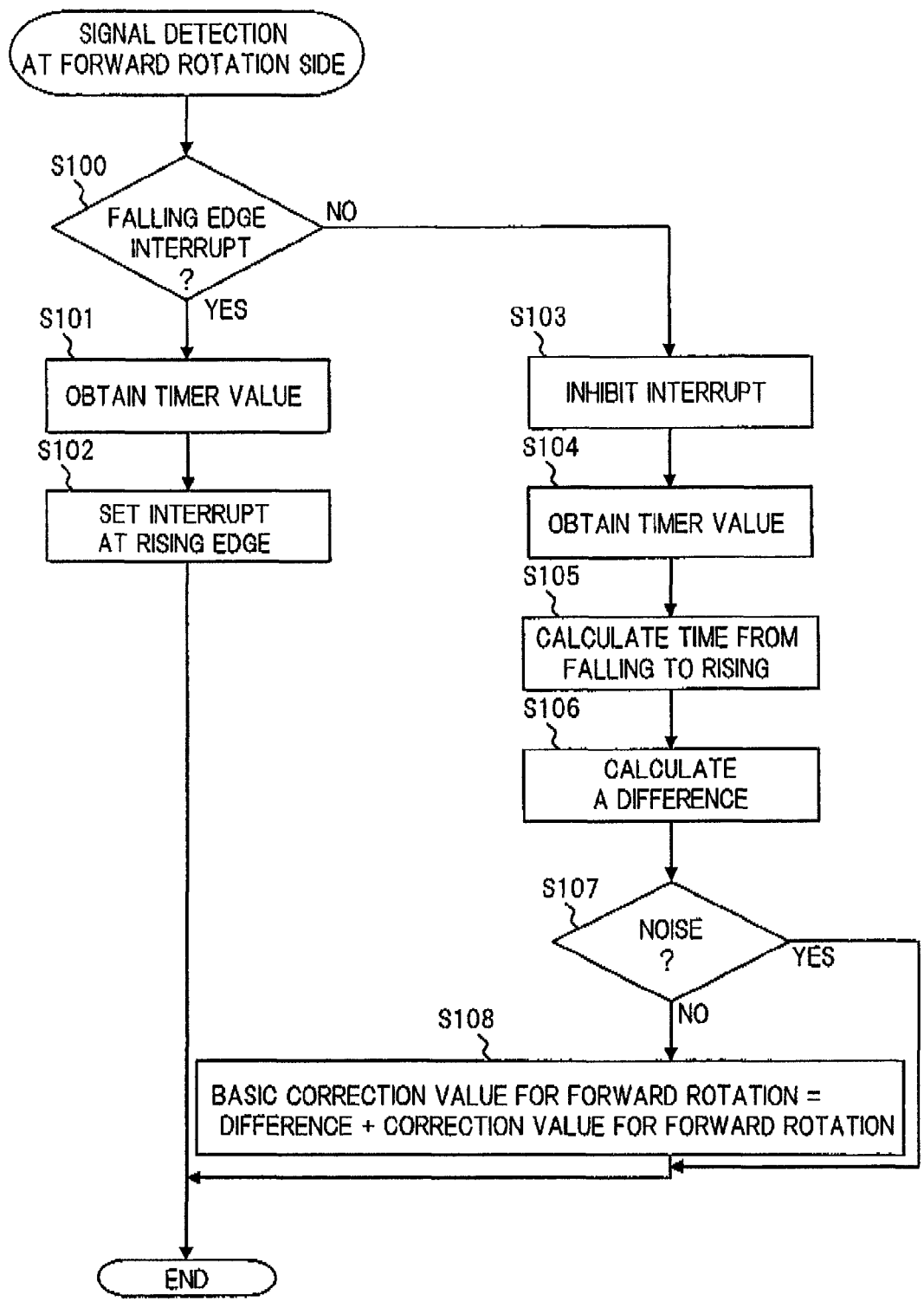
FIG. 21 is a flowchart illustrating a detection processing for an output on the forward rotation side when the output from the driving circuit is inputted after inversion, according to an embodiment of the present invention.
Figure 22:
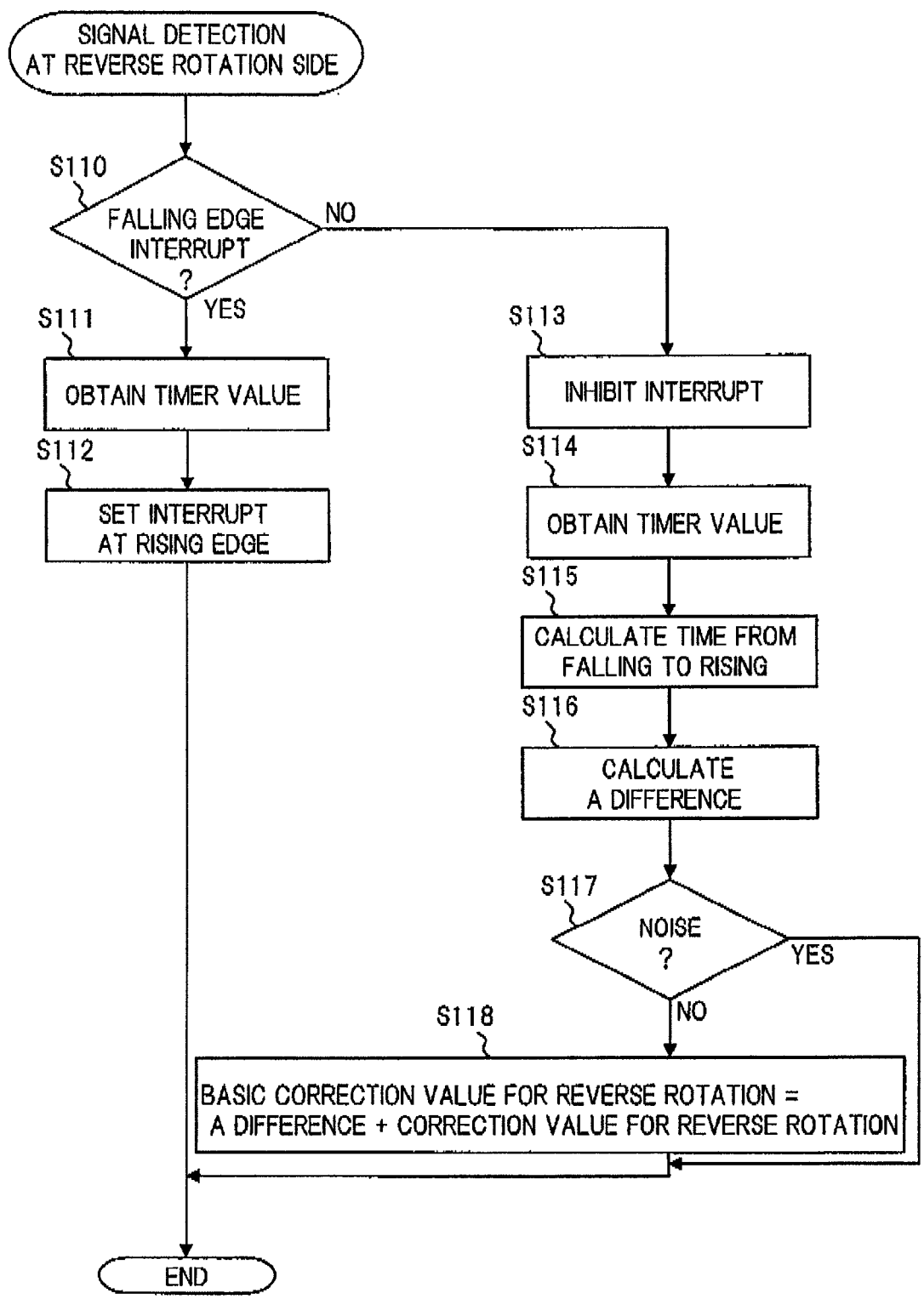
FIG. 22 is a flowchart illustrating a detection processing for an output on the reverse rotation side when the output from the driving circuit is inputted after inversion, according to an embodiment of the present invention.

The processes shown in FIGS. 17 through 19 are the processes that read-in the output from driving circuit 401 to signal detecting unit 501 as it is without being inverted by pulse detecting circuit 701 and are applied when the time from the rising to the falling of the read-in signal represents the ON-duty of motor 101, When the output from driving circuit 401 is inverted by pulse detecting circuit 701 and is read-in to signal detecting unit 501 and when the time from the failing to the rising of the read-in signal to signal detecting unit 601 represents the ON-duty of motor 101, processes shown in flowcharts of FIGS. 20 to 22 are executed, instead of the processes indicated in FIGS. 17 through 19.

The flowchart of FIG. 20 shows a routine judging the calculation start of the basic correction value HDB, the routine being repeatedly executed at every predetermined minute period of time.

Step S90 makes judgment as to whether motor 101 is driven or stopped. If judgment indicates that motor 101 is driven, the process goes to step S91.

Step S91 makes judgment as to whether a predetermined cycle (100 ms) has elapsed from the time of calculation of the previous basic correction value HDB.

If judgment indicates that the predetermined cycle has not elapsed, the routine is ended as it is and, if it is judged that the predetermined cycle has elapsed, judgment is made on the update timing of the basic correction value HDB and then the process goes to step S92.

Step S92 makes judgment as to whether motor 101 is driven in the forward rotation direction or in the reverse rotation direction.

If it is judged that motor 101 is driven in the forward rotation direction, the process goes to step S93 to execute the setting that generates the falling (ON→OFF) edge interrupt for the motor driving output on the forward rotation side inputted to signal input means 511 in interrupt generating means 512 and the next step S94 permits the interrupt processing to be executed at the falling edge of the motor driving output on the forward rotation side.

If it is judged that motor 101 is driven in the reverse rotation direction, on the other hand, the process goes to step S95 to execute the setting that generates the falling edge interrupt for the motor driving output on the reverse rotation side inputted to signal input means 511 in interrupt generating means 512 and the next step S96 permits the interrupt processing to be executed at the falling edge of the motor driving output on the reverse rotation side.

The process shown in the flowchart of FIG. 20 is performed when pulse detecting circuit 701 outputs the output from driving circuit 401 after inversion and the falling (ON→OFF) edge interrupt is actually an interrupt in a power conducting timing to motor 101.

The flowchart of FIG. 21 is a routine showing the detection processing for the motor driving output on the forward rotation side, the interrupt processing being performed based on the edge detection of the motor driving output on the forward rotation side.

Step S100 makes judgment as to whether or not the current interrupt processing is a processing based on the falling edge of the motor driving output on the forward rotation side.

If judgment indicates that the interrupt processing is performed by the falling edge, the process goes to step S101 to read-in the value of the free run counter in counter means 516 and the next step S102 is set so as to generate the interrupt in the rising (OFF→ON) edge of the motor driving output on the forward rotation side.

Step S102 performs the interrupt setting at the rising edge and then executes the interrupt processing based on the edge detection of the motor driving output on the forward rotation side and, if judgment at step S100 indicates that the current interrupt processing is a processing based on the rising edge of the motor driving output on the forward rotation side, the process goes to step S103.

Step S103 inhibits the interrupt processing based on the edge of the motor driving output on the forward rotation side and the next step S104 reads-in the value of the free run counter in counter means 516.

Step S105 calculates the on-time (ON-duty) of the motor driving output on the forward rotation side as a difference between the value of the free run counter read-in when performing the interrupt processing based on the falling edge of the motor driving output on the forward rotation side and the value of the free run counter read-in the current interrupt processing based on the rising edge of the motor driving output on the forward rotation side.

The process indicated in the flowchart of FIG. 21 is executed when pulse detecting circuit 701 outputs the output from driving circuit 401 after inversion, the falling (ON→OFF) edge interrupt is actually an interrupt in a power conducting timing to motor 101 and the rising (OFF→ON) edge interrupt is actually an interrupt in a power interrupting timing to motor 101, and the time from the falling to the rising represents the on-time (ON-duty) of motor 101.

Step S106 calculates the difference between the target ON-duty and the ON-duty calculated at step S105 by difference detecting means 513.

Step S107 compares the absolute value of the difference and the previously set threshold value and when the absolute value of the difference exceeds the threshold value, judgment is made that the measurement result of the on-time (ON-duty) of the motor driving output on the forward rotation side is subjected to the noise effect so that the routine bypasses step S108 and is ended as it is, thereby inhibiting the update of the basic correction value HDB for the forward rotation based on the measurement result.

As a result, when the routine bypasses step S108 and is ended as it is, the basic correction value HDB for the forward rotation holds the previous value.

Meanwhile, if the absolute value of the difference is equal to or less than the threshold value, judgment is made that the measurement result of the on-time (ON-duty) of the motor driving output on the forward rotation side is not subjected to the noise effect so that the process goes to step S108.

Step S108 calculates the basic correction value HDB for the forward rotation according to the following equation based on the difference of the on-time (ON-duty) obtained at step S105 and the correction value HD for the forward rotation.

The basic correction value HDB for forward rotation=a difference+the correction value HD for forward rotation.

The flowchart of FIG. 22 is a routine indicating the detection processing on the motor driving output on the reverse rotation side, the interrupt processing being performed based on the edge detection of the motor driving output on the reverse rotation side.

Step S110 judges as to whether a current interrupt processing is a processing based on the falling edge of the motor driving output on the reverse rotation side.

If it is judged that the interrupt processing is executed by the falling edge, it goes to step S111 to read-in the value of the free run counter in counter means 516 and next step S112 generates the interrupt at the rising edge of the motor driving output on the reverse rotation side.

Step S112 performs the interrupt setting at the rising edge and then performs the interrupt processing based on the edge detection of the motor driving output on the reverse rotation side and, if it is judged at step S110 that the current interrupt processing is a processing based on the rising edge of the motor driving output on the reverse rotation side, the process goes to step S113.

Step S113 inhibits the interrupt processing based on the edge of the motor driving output on the reverse rotation side and next step S114 reads-in the value of the free run counter in counter means 516.

Step S115 calculates the on-time (ON-duty) of the motor driving output on the reverse rotation side as a difference between the value of the free run counter read-in when performing the interrupt processing based on the falling edge of the motor driving output on the reverse rotation side and the value of the free run counter read-in the current interrupt processing based on the rising edge of the motor driving output on the reverse rotation side.

The process indicated in the flowchart of FIG. 22 is performed when pulse detecting circuit 701 outputs the output from driving circuit 401 after inversion, the falling (ON→OFF) edge interrupt is actually an interrupt in a power conducting timing to motor 101 and the rising (OFF→ON) edge interrupt is actually an interrupt in a power interrupting timing to motor 101, and the time from the falling to the rising represents the on-time (ON-duty) of motor 101.

Step S116 calculates the difference between the target ON-duty and the ON-duty calculated at step S115 by difference detecting means 513.

Step S117 compares the absolute value of the difference and the previously set threshold value and when the absolute value of the difference exceeds the threshold value, judgment is made that the measurement result of the on-pulse-time (ON-duty) of the motor driving output on the reverse rotation side is subjected to the noise effect so that the routine bypasses step S118 and is ended as it is, thereby inhibiting the update of the basic correction value HDB for the reverse rotation based on the measurement result.

As a result, when the routine bypasses step S118 and is ended as it is, the basic correction value HDB for the reverse rotation holds the previous value.

Meanwhile, if the absolute value of the difference is equal to or less than the threshold value, it is judged that the measurement result of the on-time (ON-duty) of the motor driving output on the reverse rotation side is not subjected to the noise effect so that it goes to step S118.

Step S118 calculates the basic correction value HDB for the reverse rotation according to the following equation based on the difference of the on-time (ON-duty) obtained at step S115 and the correction value HD for the reverse rotation.

The basic correction value HDB for reverse rotation=a difference+the correction value HD for reverse rotation.

Figure 23:
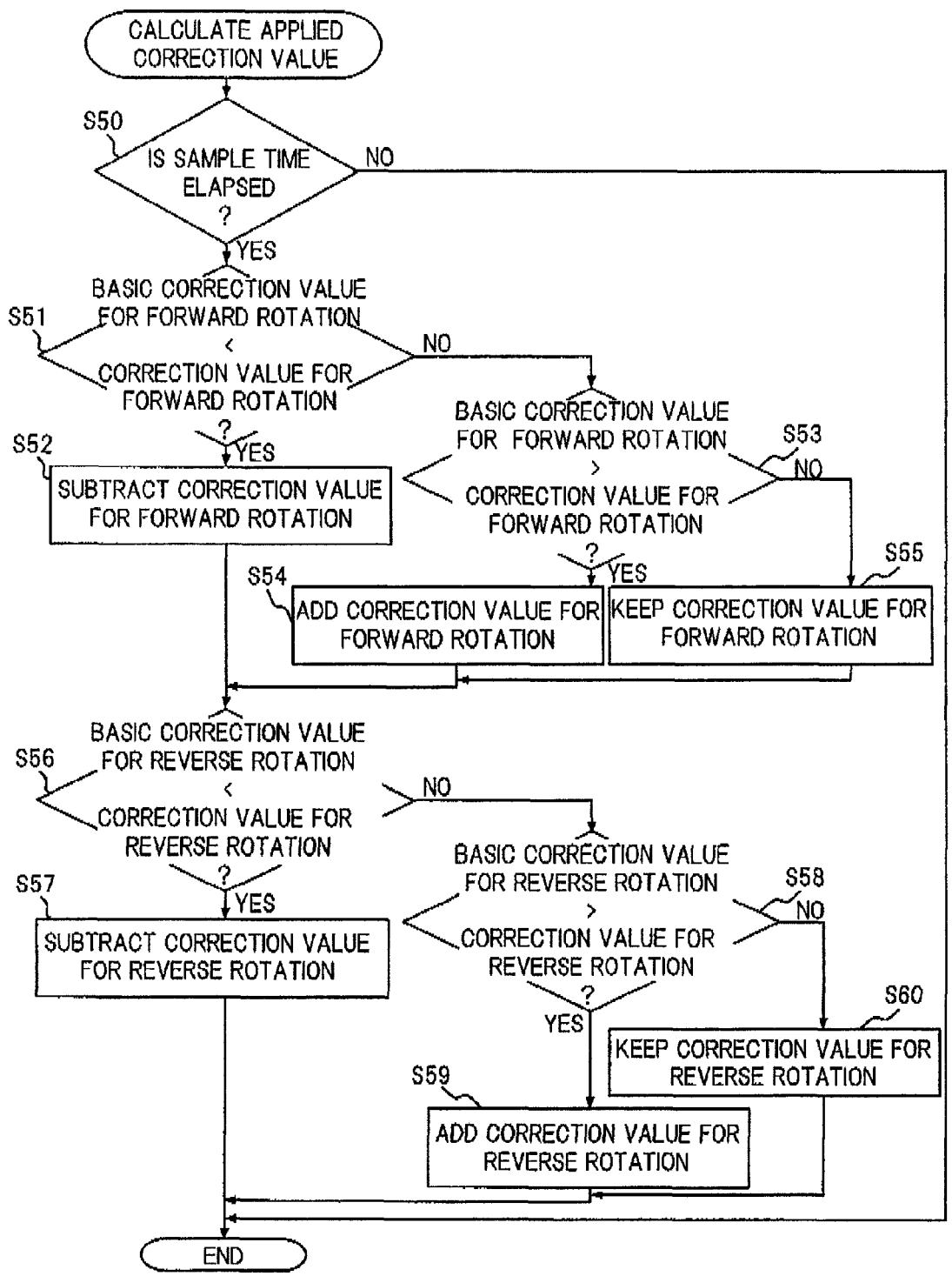
FIG. 23 is a flowchart illustrating a calculation processing for a correction value HD according to an embodiment of the present invention.

The flowchart of FIG. 23 shows a routine for performing the calculation of the correction value HD, the routine being performed per predetermined micro time.

Step S50 judges whether a predetermined cycle (10 ms) has elapsed from the time of the calculation of the previous correction value HD and if it is judged that the predetermined cycle has elapsed, the process goes to step S51 by judging the update timing of the correction value HD.

Step S51 makes judgment as to whether the correction value HD for the forward rotation is larger than the basic correction value HDB for the forward rotation.

If the basic correction value HDB for the forward rotation<the correction value HD for the forward rotation, the process goes to step S52 so that the correction value HD for the forward rotation is decremented by 1 that is a unit for making modification.

Meanwhile, if the basic correction value HDB for the forward rotation≧the correction value HD for the forward rotation, the process goes to step S53 to make judgment as to whether the basic correction value HDB for the forward rotation>the correction value HD for the forward rotation.

If the basic correction value HDB for the forward rotation≧the correction value HD for the forward rotation, the process goes to step S54 so that the correction value HD for the forward rotation is incremented by 1 that is a unit for making modification.

Also, at step S53, if it is judged that the basic correction value HDB for the forward rotation>the correction value HD for the forward rotation is not satisfied, since the basic correction value HDB for the forward rotation=the correction value HD for the forward rotation, the process goes to step S55 to hold the correction value HD for the forward rotation at that time.

Figure 25:
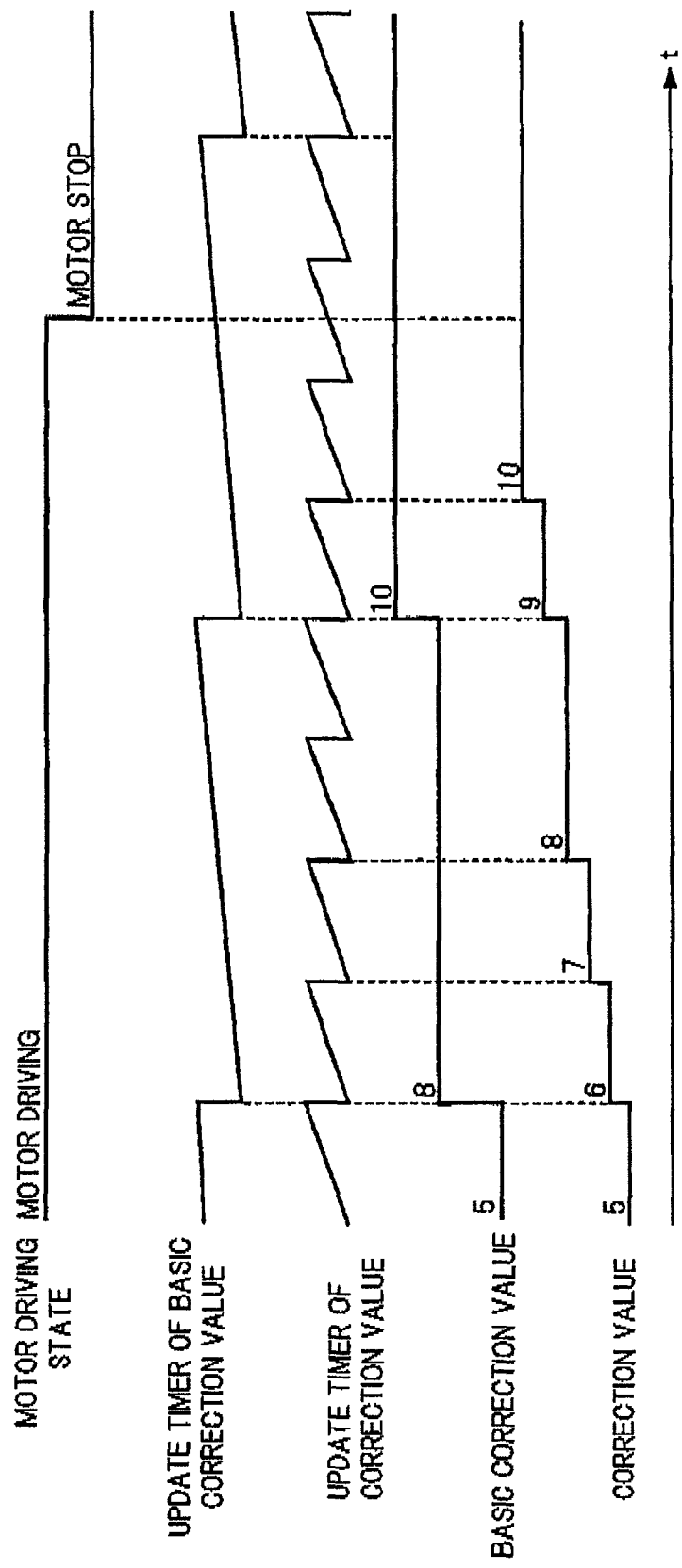
FIG. 25 is a timing chart illustrating an update timing of both of the basic correction value HDB and the correction value HD according to an embodiment of the present invention.

The correction value HD for the forward rotation is gradually changed in a direction to approach the basic correction value HDB for the forward rotation per predetermined cycle according to the processes of steps S51 to S55 so that when it conforms to the basic correction value HDB for the forward rotation, the value at that time is held (see FIG. 25).

Step S56 judges whether or not the correction value HD for the reverse rotation is larger than the basic correction value HDB for the reverse rotation.

If the basic correction value HDB for the reverse rotation<the correction value HD for the reverse rotation, the process goes to step S57 so that the correction value HD for the reverse rotation is decremented by 1 that is a unit for making modification.

Meanwhile, if the basic correction value HDB for the reverse rotation≧the correction value HD for the reverse rotation, the process goes to step S58 to judge whether the basic correction value HDB for the reverse rotation>the correction value HD for the reverse rotation.

If the basic correction value HDB for the reverse rotation>the correction value HD for the reverse rotation, the process goes to step S59 so that the correction value HD for the reverse rotation is incremented by 1 that is a unit for making modification.

Also, at step S58, if it is judged that the basic correction value HDB for the reverse rotation>the correction value HD for the reverse rotation is not satisfied, since the basic correction value HDB for the reverse rotation=the correction value HD for the reverse rotation, it goes to step S60 to hold the correction value HD for the reverse rotation at that time.

The correction value HD for the reverse rotation is gradually changed in a direction to approach the basic correction value HDB for the reverse rotation per predetermined cycle according to the processes of steps S56 through S60 so that when it conforms to the basic correction value HDB for the reverse rotation, the value at that time is held (see FIG. 25).

The update cycle of both the correction value HD for the forward rotation and the correction value HD for the reverse rotation may be changed according to the control conditions.

For example, when the target duty is changed above a predetermined width, the motor temperature is monitored by a motor temperature sensor just after the update of the basic correction value HDB is inhibited based on the noise judgment, and the update cycle is shortened when the increasing width or reducing width of the temperature is above a predetermined width, etc.

Since the time when the target duty is greatly changed corresponds to the time when the motor torque is suddenly changed and therefore, if the correction value HD is relatively rapidly changed, the actual duty is rapidly converged to the target duty without applying a large effect onto the stability or drivability of the vehicle, while making it possible to rapidly transfer to a necessary torque distribution.

Also, if the update of the target value is inhibited based on the noise judgment, since the required time for the correction HD to approach the basic correction value HDB is excessively long, so that the convergence to the target duty is deteriorated, after resuming the update from the inhibition state of the update, for example, for the time until approaching the change in the correction value HD in the case where the update inhibition is not performed, the update cycle is shortened to keep the convergence of the correction value HD.

Also, in a situation where the correction request of the target duty is changed according to the change in the motor temperature, if the update cycle of the correction value HD is long, the correction value HD cannot be tracked and changed up to the correction request corresponding to the temperature change. Therefore, the convergence of the actual duty to the target duty is delayed, so that the control of the torque distribution to the requested value is delayed. Thus, when the temperature is suddenly changed, the update cycle is shortened.

However, if the update cycle of the correction value HD is excessively short, the stability or drivability of the vehicle is suddenly changed. Therefore, it is necessary to preliminarily select an optimal update cycle for a change in the target duty, by taking into account the stability or drivability of the vehicle.

Also, when the motor driving is a normal state, if the update cycle of the correction value HD is short, the torque distribution is changed according to the change in the correction value HD under the condition that there is originally no request for a change in the torque distribution. Therefore, the update cycle is made long to a degree that the stability or drivability of the vehicle is not suddenly changed.

In the embodiments, although the modification unit used for modifying the correction value HD is a constant value (=1), for example, in the 4H mode the movement of the rotation axis of the motor steps and the overshoot does not occur even when correcting the duty, so that the correction value HD approaches the basic correction value HDB at a large step width. In the AUTO mode, on the other hand, when motor 101 is driven according to the change in the requested torque distribution, the correction value HD of the duty is suddenly changed to lead to the overshoot so that the correction value HD approaches the basic correction value HDB at a small step width.

Figure 24:
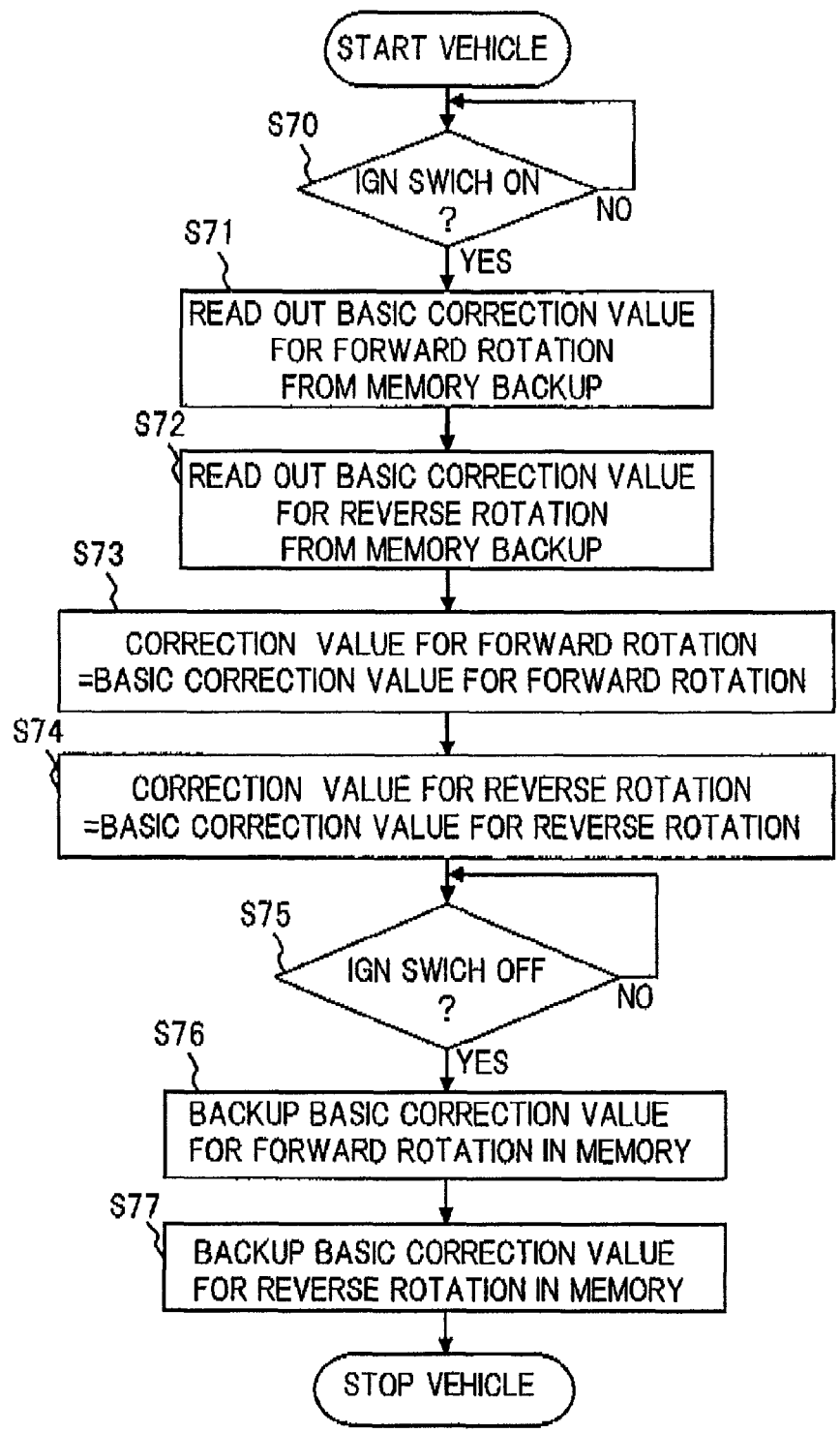
FIG. 24 is a flowchart illustrating a backup processing and a read-out processing of both of the basic correction value HDB and the correction value HD according to an embodiment of the present invention.

The flowchart of FIG. 24 indicates a routine of reading out the correction value and performing the backup processing when the vehicle starts and steps, the routine being performed per predetermined micro time.

Step S70 judges whether the ignition switch (engine switch) of the engine mounted in the vehicle is turned on.

If it is judged that the ignition switch (engine switch) is turned on, it goes to step S71 to read out the basic correction value HDB for the forward rotation stored in backup memory (EEPROM) 601 and next step S72 reads out the basic correction value HDB for the reverse rotation stored in backup memory (EEPROM) 601.

Step S73 sets the same value as the basic correction value HDB for the forward rotation read out in step S71 to the correction value HD for the forward rotation and next step S74 sets the same value as the basic correction value HDB for the reverse rotation read out in step S72 to the correction value HD for the reverse rotation.

Step S75 judges whether or not the ignition switch (engine switch) of the engine mounted in the vehicle is turned off.

If it is judged that the ignition switch (engine switch) is turned off, the process goes to step S76 to store the basic correction value HDB for the forward rotation at that time in backup memory (EEPROM) 601 and the next step S77 stores the basic correction value HDB for the reverse rotation at that time in backup memory (EEPROM) 601.

In other words, as to the basic correction value HDB for the forward rotation and the basic correction value HDB for the reverse rotation, the update starts from the point of time when the ignition switch (engine switch) is turned on using the value finally calculated at the time of the previous driving as the initial value.

Meanwhile, as to the correction value HD for the forward rotation and the correction value HD for the reverse rotation, even though the basic correction value HDB for the forward rotation=the correction value HD for the forward rotation and the basic correction value HDB for the reverse rotation=the correction value HD for the reverse rotation at the point is not established in time when the ignition switch (engine switch) is turned off, the update starts from a state where it conforms to the basic correction value HDB when the ignition switch (engine switch) is turned on.

Therefore, the correction request of the target duty due to the fluctuation of driving circuit 401 is preserved and motor 101 can be controlled at high accuracy from just after the ignition switch (engine switch) is turned on.

Although the embodiment sets the correction value HD for correcting the target ON-duty to conform the actual ON-duty to the target ON-duty, it can correct the OFF-duty instead of the ON-duty. Hereinafter, the embodiments performing the correction control of the OFF-duty will be described.

Figure 26:
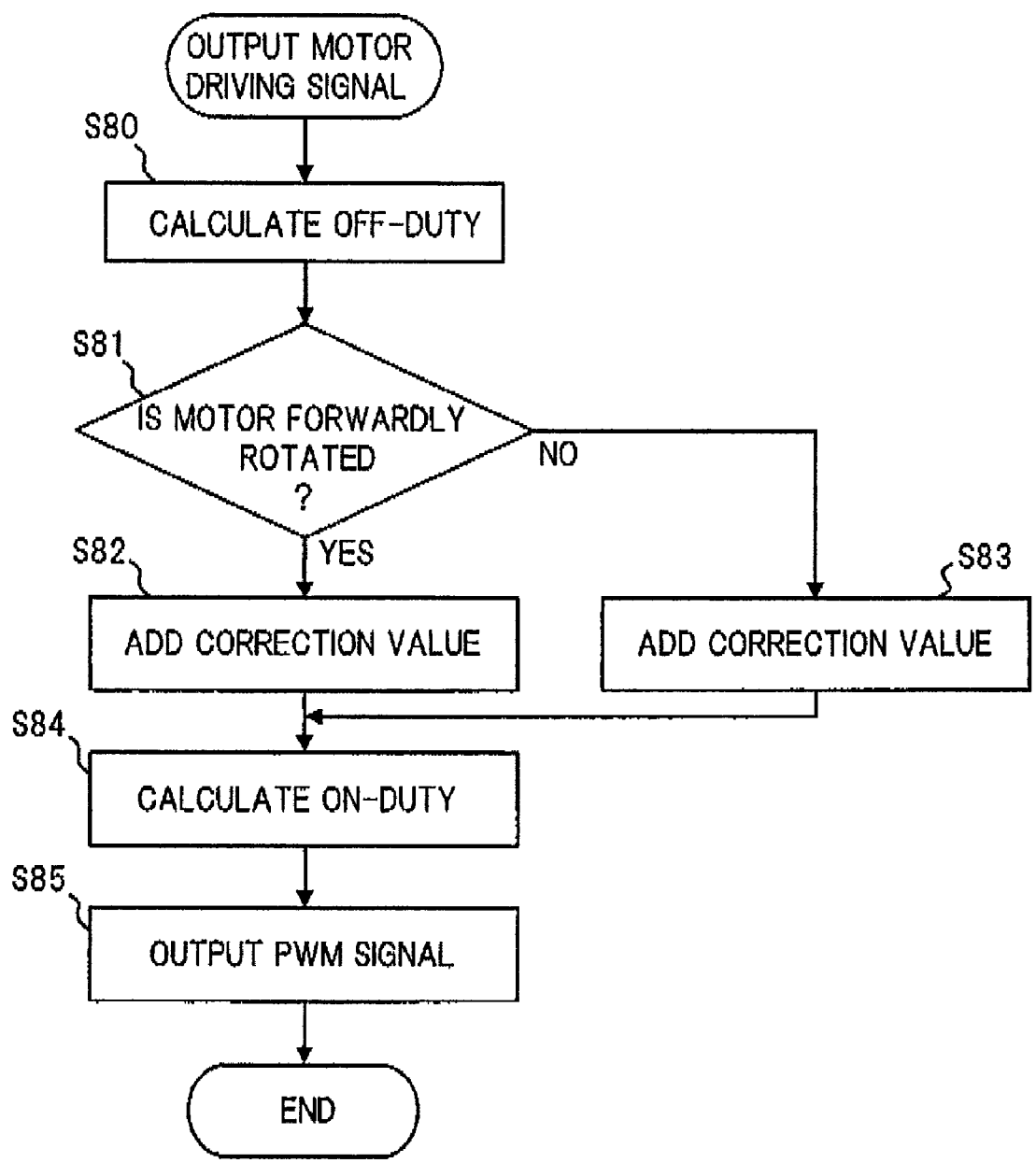
FIG. 26 is a flowchart illustrating an output processing for the PWM signal when correcting of OFF-duty is performed, according to an embodiment of the present invention.

The flowchart of FIG. 26 rewrites the ON-duty and the OFF-duty in the flowchart in FIG. 16 into the OFF-duty and the ON-duty, respectively. The correction setting of the target duty is performed based on the flowchart of FIG. 26.

A routine indicated in the flowchart of FIG. 26 is repeatedly executed at every predetermined minute period of time. At first, a step 80 calculates the target OFF-duty (target off-pulse-width) based on the target (target voltage) of the applied voltage to the motor.

Step S81 judges whether the forward rotation of motor 101 is required or the reverse rotation thereof is required.

If it is judged that the forward rotation is required, it goes to step S82 to correct the target OFF-duty based on the correction value HD for the forward rotation, thereby obtaining the target OFF-duty after the correction.

Meanwhile, if it is judged that the reverse rotation is required, it goes to step S83 to correct the target OFF-duty based on the correction value HD for the reverse rotation, thereby obtaining the target OFF-duty after the correction.

Since the difference in the correlation between the target OFF-duty and the actual OFF-duty of the driving signal occurs by the rotation direction of motor 101, the present embodiment sets the basic correction value HDB and the correction value HD separately depending on whether the rotation direction is the forward direction or the reverse direction.

Step S84 calculates the target ON-duty after the correction based on the target OFF-duty after the correction that is calculated at step S82 or step S83.

The processes of steps S81 to S84 are performed by signal control means 311.

Step S85 allows signal output means 312 to output the PWM signal to driving circuit 401 based on the target ON-duty after the correction and the target OFF-duty after the correction.

Figure 27:
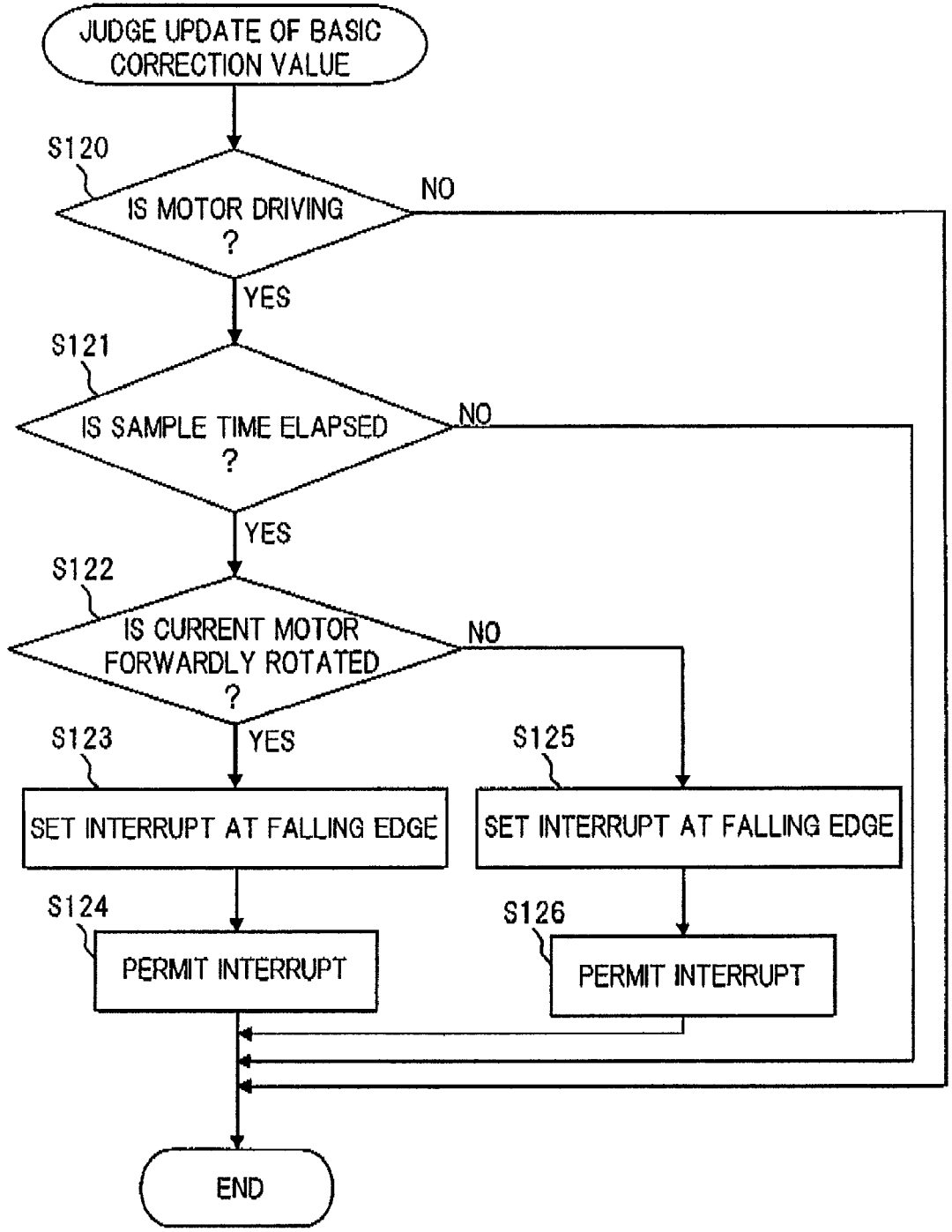
FIG. 27 is a flowchart illustrating a judgment processing for a calculation start of the basic correction value HDB when correcting of the OFF-duty is performed, according to an embodiment of the present invention.

The flowchart of FIG. 27 shows a routine for judging the calculation start of the basic correction value HDB in the embodiment correcting the OFF-duty based on the measurement value, the routine being performed per predetermined micro time.

Figure 28:
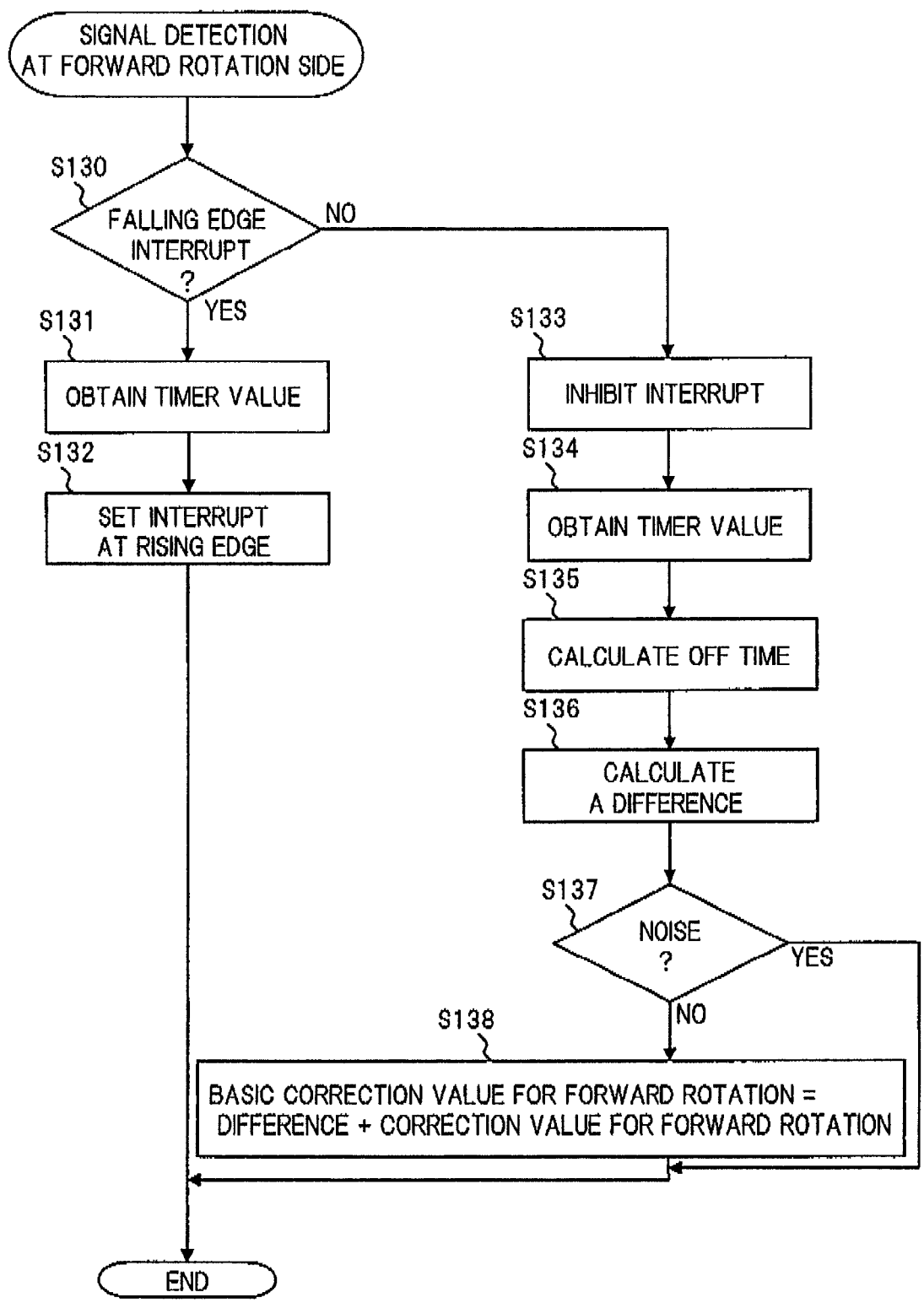
FIG. 28 is a flowchart illustrating the detection processing for the driving output on the forward rotation side when correcting of the OFF-duty is performed, according to an embodiment of the present invention.
Figure 29:
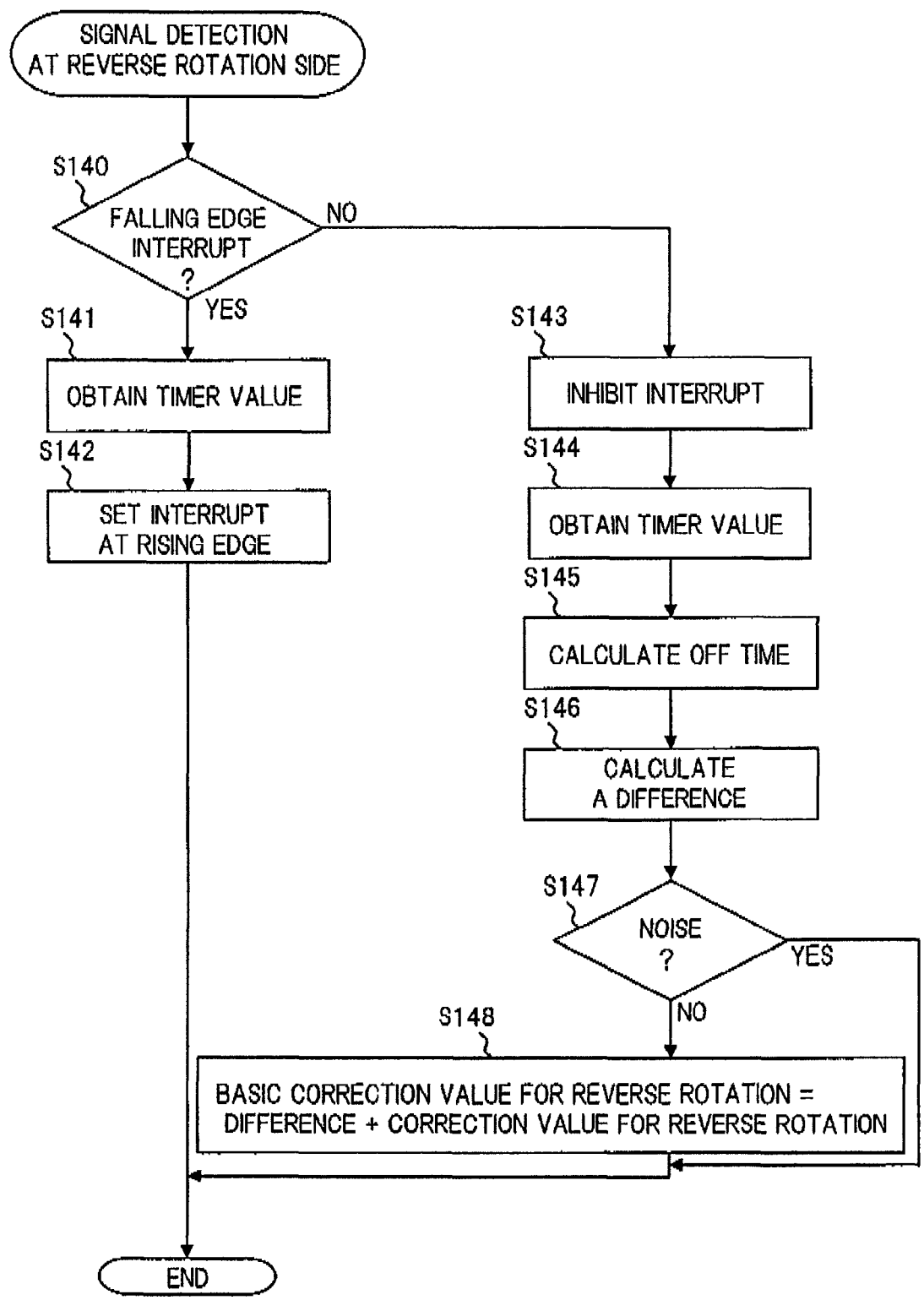
FIG. 29 is a flowchart illustrating the detection processing for the driving output on the reverse rotation side when correcting of the OFF-duty is performed, according to an embodiment of the present invention.

Also, the flowcharts of FIGS. 27 to 29 are applied when the output from driving circuit 401 is output to signal detecting unit or circuit 501 as it is without being inverted by pulse detecting circuit 701.

Step S120 judges whether motor 101 is driven or stopped. If it is judged that motor 101 is driven, it goes to step S121.

Step S121 judges whether a predetermined cycle (100 ms) is elapsed from the point in time of the calculation of the previous basic correction value HDB.

If it is judged that the predetermined cycle is not elapsed, the routine is ended as it is and if it is judged that the predetermined cycle is elapsed, it judges the update timing of the basic correction value HDB and then goes to step S122.

Step S122 judges whether motor 101 is driven in the forward rotation direction or in the reverse rotation direction.

If it is judged that motor 101 is driven in the forward rotation direction, it goes to step S123 to perform the setting that generates the falling (ON→OFF) edge interrupt for the motor driving output at the forward rotation side input to signal input means 511 in interrupt generating means 512, and next step S124 permits the interrupt processing on the falling edge of the motor driving output at the forward rotation side.

If it is judged that motor 101 is driven in the reverse rotation direction, on the other hand, it goes to step S125 to perform the setting that generates the falling edge interrupt for the motor driving output at the reverse rotation side input to signal input means 511 in interrupt generating means 512, and next step S126 permits the interrupt processing on the falling edge of the motor driving output at the reverse rotation side.

The flowchart of FIG. 28 is a routine showing the detection processing on the motor driving output at the forward rotation side, the interrupt processing being performed based on the edge detection of the motor driving output at the forward rotation side.

Step S130 judges whether a current interrupt processing is a processing based on the falling edge of the motor driving output at the forward rotation side.

If it is judged that the interrupt processing is performed by the falling edge, it goes to step S131 to read-in the value of the free run counter in counter means 516 and next step S132 is set to generate the interrupt in the rising (OFF→ON) edge of the motor driving output at the forward rotation side.

Step S132 performs the interrupt setting at the rising edge and then performs the interrupt processing based on the edge detection of the motor driving output at the forward rotation side and, if it is judged at step S130 that the current interrupt processing is a processing based on the rising edge of the motor driving output at the forward rotation side, it goes to step S133.

Step S133 inhibits the interrupt processing based on the edge of the motor driving output at the forward rotation side and next step S134 reads-in the value of the free run counter in counter means 516.

Step S135 calculates the off time (OFF-duty) of the motor driving output at the forward rotation side as a difference between the value of the free run counter read-in when performing the interrupt processing based on the falling edge of the motor driving output at the forward rotation side and the value of the free run counter read-in the current interrupt processing based on the rising edge of the motor driving output at the forward rotation side.

Since the process shown in the flowchart of FIG. 28 is performed when the output from driving circuit 401 is output to signal detecting unit 501 as it is without being inverted by pulse detecting circuit 701, the time from the falling edge to the rising edge is the off time (OFF-duty).

Step S136 calculates the difference between the target OFF-duty and the OFF-duty calculated at step S135 by difference detecting means 513.

Step S137 compares an absolute value of the difference and a previously set threshold value and when the absolute value of the difference exceeds the threshold value, judges that the measurement result of the off time (OFF-duty) of the motor driving output at the forward rotation side is subjected to the noise effect so that the routine bypasses a step 38 and is ended as it is, thereby inhibiting the update of the basic correction value HDB for the forward rotation based on the measurement result.

As a result, when the routine bypasses step 138 and is ended as it is, the basic correction value HDB for the forward rotation holds the previous value.

Meanwhile, if the absolute value of the difference is equal to or less than the threshold value, it is judged that the measurement result of the off time (OFF-duty) of the motor driving output at the forward rotation side is not subjected to the noise effect so that it goes to step S138.

Step S138 calculates the basic correction value HDB for the forward rotation according to the following equation based on the difference of the off time (OFF-duty) obtained at step S135 and the correction value HD for the forward rotation.

Basic correction value HDB for forward rotation=a difference+correction value HD for forward rotation.

The flowchart of FIG. 29 is a routine showing the detection processing on the motor driving output at the reverse rotation side, the interrupt processing being performed based on the edge detection of the motor driving output at the reverse rotation side.

Step S140 judges whether a current interrupt processing is a processing based on the falling edge of the motor driving output at the reverse rotation side.

If it is judged that the interrupt processing is performed by the falling edge, it goes to step S141 to read-in the value of the free run counter in counter means 516 and next step S142 generates the interrupt at the rising edge of the motor driving output at the reverse rotation side.

Step S142 performs the interrupt setting at the rising edge and then performs the interrupt processing based on the edge detection of the motor driving output at the reverse rotation side and, if it is judged at step S140 that the current interrupt processing is a processing based on the rising edge of the motor driving output at the reverse rotation side, it goes to step S143.

Step S143 inhibits the interrupt processing based on the edge of the motor driving output at the reverse rotation side and next step S144 reads-in the value of the free run counter in counter means 516.

Step S145 calculates the off time (OFF-duty) of the motor driving output at the reverse rotation side as a difference between the value of the free run counter read-in when performing the interrupt processing based on the falling edge of the motor driving output at the reverse rotation side and the value of the free run counter read-in the current interrupt processing based on the rising edge of the motor driving output at the reverse rotation side.

Since the process shown in the flowchart of FIG. 29 is performed when the output from driving circuit 401 is output to signal detecting unit 501 as it is without being inverted by pulse detecting circuit 701, the time from the falling edge to the rising edge is the off time (OFF-duty).

Step S146 calculates the difference between the target OFF-duty and the OFF-duty calculated at step S145 by difference detecting means 513.

Step S147 compares the absolute value of the difference and the previously set threshold value and when the absolute value of the difference exceeds the threshold value, judges that the measurement result of the off time (OFF-duty) of the motor driving output at the reverse rotation side is subjected to the noise effect so that the routine bypasses a step 148 and is ended as it is, thereby inhibiting the update of the basic correction value HDB for the reverse rotation based on the measurement result.

As a result, when the routine bypasses step S148 and is ended as it is, the basic correction value HDB for the reverse rotation holds the previous value.

Meanwhile, if the absolute value of the difference is equal to or less than the threshold value, it is judged that the measurement result of the off pulse time (OFF-duty) of the motor driving output at the reverse rotation side is not subjected to the noise effect so that it goes to step S148.

Step S148 calculates the basic correction value HDB for the reverse rotation according to the following equation based on the difference of the off time (OFF-duty) obtained at step S145 and the correction value HD for the reverse rotation.

Basic correction value HDB for reverse rotation=a difference+correction value HD for reverse rotation.

Also, the flowcharts of FIGS. 27 to 29 are performed when the output from driving circuit 401 is output to signal detecting unit 501 as it is without being inverted by pulse detecting circuit 701. However, when pulse detecting circuit 701 inverts the output from driving circuit 401 and outputs it to signal detecting unit 501, in the flowcharts of FIGS. 27 to 29, the processes may be performed by rereading the falling as the rising and the rising as the falling.

Also, even in the embodiment correcting the target OFF-duty from the measurement result of the OFF-duty, the processes shown in the flowcharts of FIGS. 23 and 24 are equally performed.

Further, although the embodiments use the system capable of switching the rotation direction of motor 101, the rotation direction of motor 101 may be constant. Also, the motor is not limited to the motor for the transfer and may be a motor, etc.

used for switching the position of AT. Also, the embodiments are not limited to the system for the vehicle using the motor.

The entire contents of Japanese Patent Application NO. 2007-063898, filed Mar. 13, 2007 and Japanese Patent Application NO. 2008-033403, filed Feb. 14, 2008 are incorporated herein by reference.

While only selected embodiments have been chosen to illustrate the present invention, it will be apparent to those skilled in the art from this disclosure that various change and modification can be made herein without departing from the scope of the invention as defined in the appended claims.

Furthermore, the foregoing descriptions of the embodiments according to the present invention are provided for illustration only, and not for the purpose of limiting the invention as defined by the appended claims and their equivalents.

I claim:

1. A control apparatus for controlling a motor for a vehicle, comprising:
    a driving unit configured to drive the motor for the vehicle based on a PWM signal inputted therein;
    a measuring unit configured to measure a duty of an output signal from the driving unit;
    a calculating unit configured to calculate a target duty of the PWM signal;
    a correcting unit configured to correct the target duty based on a difference between the target duty and the duty of the output signal from the driving unit and to output the target duty after being corrected; and
    a PWM signal generating unit configured to generate the PWM signal based on the target duty after being corrected which is outputted from the correcting unit, wherein the correcting unit is configured to execute setting of a correction value for correcting the target duty based on the difference and to correct the target duty based on the set correction value thereby outputting the target duty after being corrected while changing an update cycle of the correction value according to a given condition.

2. The control apparatus according to claim 1, wherein the correcting unit corrects the target duty and outputs the target duty after being corrected when the difference is equal to or less than a threshold value.

3. The control apparatus according to claim 1, wherein the correcting unit is configured to gradually change a correction value for correcting the target duty in a direction allowing the difference be cancelled and to correct the target duty based on the correction value, thereby outputting the target duty after being corrected.

4. The control apparatus according to claim 1, wherein the correcting unit is configured to change the update cycle of the correction value according to an amount of change in the target duty.

5. The control apparatus according to claim 1, wherein the correcting unit is configured to change the update cycle of the correction value according to said difference.

6. The control apparatus according to claim 1, wherein the correcting unit is configured to shorten the update cycle of the correction value immediately after resuming an operation for updating from a state where the update of the correction value is inhibited.

7. The control apparatus according to claim 1, wherein the correcting unit is configured to execute setting of a correction value for correcting the target duty based on said difference for each of rotating directions of the motor and to correct the target duty for each of the rotating directions based on the set correction value thereby outputting the target duty after being corrected.

8. The control apparatus according to claim 1, wherein the motor for the vehicle is comprised of a motor that continuously varies a power distribution by a transfer of the vehicle in response to a generating torque of the motor, and
    the calculating unit is configured to calculate the target duty based on a target generating torque corresponding to a request for the power distribution.

9. A control apparatus for controlling a motor for a vehicle, comprising:
    a driving means for driving the motor for the vehicle based on a PWM signal that is inputted in the driving means;
    a measuring means for measuring a duty of an output signal from the driving means;
    a calculating means for calculating a target duty of the PWM signal;
    a correcting means for correcting the target duty based on a difference between the target duty and the duty of the output signal from the driving means and for outputting the target duty after being corrected; and
    a PWM signal generating means for generating the PWM signal based on the target duty after being corrected that is outputted from the correcting means, wherein the correcting means is configured to execute setting of a correction value for correcting the target duty based on the difference and to correct the target duty based on the set correction value thereby outputting the target duty after being corrected while changing an update cycle of the correction value according to a given condition.

10. A control method of controlling a motor for a vehicle through controlling a driving circuit of the motor based on a PWM signal, comprising the steps of:
    measuring a duty of an output signal from the driving circuit;
    calculating a difference between a target duty of the PWM signal and the duty of the output signal from the driving circuit;
    correcting the target duty based on the above-said difference; and
    generating the PWM signal based on the target duty after being corrected, wherein the step of correcting the target duty comprises the steps of:
    executing setting of an update cycle of a correction value for correcting the target duty according to a given condition;
    updating the correction value based on said difference at every update cycle; and
    correcting the target duty based on the correction value after updating.

11. The control method according to claim 10, wherein the step of correcting the target duty comprises the steps of:
    judging whether or not the above-said difference is equal to or less than a threshold value; and
    correcting the target duty based on said difference when the difference is equal to or less than the threshold value.

12. The control method according to claim 10, wherein the step of correcting the target duty comprises the steps of:
    gradually changing a correction value for correcting the target duty in a direction allowing said difference to be cancelled; and
    correcting the target duty based on the correction value after being changed.

13. The control method according to claim 10, wherein the step of executing setting of the update cycle comprises the step of:
    executing setting of the update cycle according to an amount of variation in the target duty.

14. The control method according to claim 10, wherein the step of executing setting of the update cycle comprises the step of:
  executing setting of the update cycle according to said difference.

15. The control method according to claim 10, wherein the step of executing setting of the update cycle comprises the step of:
  shortening the update cycle immediately after resuming updating from a state where the update of the correction value is inhibited.

16. The control method according to claim 10, wherein the step of correcting the target duty comprises the steps of:
  executing judgment as to whether the motor is in a forward rotation thereof or a reverse rotation thereof;
  executing setting of a first correction value for correcting the target duty based on said difference at a time of the forward rotation of the motor;
  executing setting of a second correction value for correcting the target duty based on said difference at a time of the reverse rotation of the motor;
  correcting the target duty based on the first correction value at the time of the forward rotation of the motor; and
  correcting the target duty based on the second correction value at the time of the reverse rotation of the motor.

17. The control method according to claim 10, wherein the motor for the vehicle is a motor that is configured to continuously vary a power distribution by a transfer of the vehicle according to a generating torque of the motor, and
  wherein the control method further comprises the step of:
    calculating the target duty of the PWM signal based on a target generating torque corresponding to a request for the power distribution.

* * * * *